United States Patent
Takahashi et al.

(10) Patent No.: US 8,284,393 B2
(45) Date of Patent: Oct. 9, 2012

(54) TIRE SHAPE INSPECTION METHOD AND TIRE SHAPE INSPECTION DEVICE

(75) Inventors: Eiji Takahashi, Kobe (JP); Naokazu Sakoda, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 189 days.

(21) Appl. No.: 12/737,009

(22) PCT Filed: Jun. 3, 2009

(86) PCT No.: PCT/JP2009/060191
§ 371 (c)(1),
(2), (4) Date: Dec. 1, 2010

(87) PCT Pub. No.: WO2009/148095
PCT Pub. Date: Dec. 10, 2009

(65) Prior Publication Data
US 2011/0069323 A1     Mar. 24, 2011

(30) Foreign Application Priority Data

Jun. 4, 2008   (JP) .................................. 2008-147184
Feb. 6, 2009   (JP) .................................. 2009-025899
Feb. 6, 2009   (JP) .................................. 2009-025942

(51) Int. Cl.
*G01N 21/00*      (2006.01)
(52) U.S. Cl. ..................... 356/237.1; 356/625
(58) Field of Classification Search .... 356/237.1–237.2, 356/625–640
See application file for complete search history.

(56) References Cited

U.S. PATENT DOCUMENTS

| | | | | |
|---|---|---|---|---|
| 4,910,411 A | * | 3/1990 | Teraguchi et al. | ........ 250/559.44 |
| 6,381,547 B1 | * | 4/2002 | Heirtzler et al. | ................. 702/39 |
| 2007/0209431 A1 | * | 9/2007 | Fujisawa et al. | ................. 73/146 |

FOREIGN PATENT DOCUMENTS

| | | |
|---|---|---|
| JP | 05-215530 | 8/1993 |
| JP | 11-138654 | 5/1999 |
| JP | 2004-156919 | 6/2004 |

OTHER PUBLICATIONS

International Search Report for Application PCT/JP2009/060191 mailed Sep. 1, 2009.

* cited by examiner

*Primary Examiner* — Michael P Stafira
(74) *Attorney, Agent, or Firm* — Stites & Harbison, PLLC; Juan Carlos A. Marquez, Esq.

(57) ABSTRACT

Disclosed is a tire shape inspection method that can reliably and without misidentification perform accurate shape defect inspection in a short period of time by excluding measurement values in a range in which embossed marks are formed from distribution information for surface height measurement values on the sidewall surface of a tire. In the method, a processor automatically detects the positions of the embossed marks based on sample surface shape information obtained from a sample of the tire, and automatically sets coordinate information for a mask range surrounding the area where said marks are present (S2-S15). The processor also causes a surface shape image based on the sample surface shape information and a mask range image based on the coordinate information for the mask range to be displayed superimposed on a display means, and changes the coordinate information for the mask range according to an operating input (S16). The processor also corrects deviation in the coordinate system between the surface height distribution information obtained from the tire undergoing inspection and the coordinate information for the mask range after changing, and excludes measurement values in the mask range from shape defect inspection processing.

16 Claims, 18 Drawing Sheets

TIRE SHAPE INSPECTION METHOD AND TIRE SHAPE INSPECTION DEVICE

TECHNICAL FIELD

The present invention relates to a tire shape inspection method and a tire shape inspection device for inspecting shape defects in a sidewall surface of a tire in which embossed marks are formed.

BACKGROUND ART

A tire has a structure that various materials, such as rubber, chemical fibers, and steel cords, are layered. If there is a non-uniform portion in the layered structure, a projection (convex portion), called a "bulge", or a recess (concave portion), called a "dent" or a "depression", generates in a region where resistance against pressure is relatively weak, when the tire is filled with air. The tire having such a shape defect, i.e., the bulge or the dent, needs to be excluded from shipped products through inspection in consideration of problems regarding safety and an external appearance.

Usually, in the tire shape inspection, the tire is rotated by a rotating machine in a state that a predetermined displacement sensor is positioned to face a tire surface (e.g., a sidewall surface or a tread surface).

For example, Patent Literature (PTL) 1 discloses a technique of irradiating a surface of a rotating tire with a slit light (line light), picking up an image of the slit light, and performing shape detection using an optical cutting (light-section) method based on the picked-up image, to thereby detect the tire surface height. With the disclosed technique, distribution information of surface height measurement values is obtained for many positions over a circumferential range of 360° of the tire surface. The surface height measurement value for each of the positions over the circumferential range of 360° of the sidewall surface or the tread surface is plotted in a two-dimensional coordinate system in which a first coordinate axis (e.g., an X-axis) represents the radial direction of the tire and a second coordinate axis (e.g., a Y-axis) represents the circumferential direction of the tire. The information thus obtained is called "surface height distribution information" hereinafter. Assuming that the surface height measurement value corresponds to a brightness value of each pixel in image data, therefore, the surface height distribution information can be handled in a similar manner to monochrome image data on a computer (image processing apparatus).

In the tire shape inspection, a shape defect inspection process for the sidewall surface is executed based on the surface height distribution information.

Embossed marks indicating the product type/model, the size, the maker's logo, etc. (called "indication marks" hereinafter) are formed on the sidewall surface of the tire. In the shape defect inspection process for the sidewall surface, therefore, embossed portions of the indication marks require to be made not erroneously detected as shape defects.

In the known shape defect inspection process, it is often performed to determine whether height change in the circumferential direction of the tire is within an allowable range, based on data obtained through low-pass filtering of the measured values of one line in the circumferential direction of the tire, which are included in the surface height distribution information.

For example, PTL 2 describes an example in which the above-mentioned low-pass filtering is realized by excluding high-frequency components from data obtained with a fast Fourier transform process that is executed on the measured values of one line in the circumferential direction of the tire, and by executing an inverse Fourier transform process on the remaining data (see paragraph [0003] in PTL 2).

Further, PTL 3 describes a technique for realizing the low-pass filtering by, instead of the fast Fourier transform process, a method of calculating contact points between the measured values of one line in the circumferential direction of the tire and a parabolic curve, and executing straight-line (linear) interpolation between two calculated contact points.

Moreover, PTL 2 describes a technique of detecting, from among data obtained with smoothing differentiation of the measured values of one line in the circumferential direction of the tire, a range from a position where change of the measured value rises steeply to a position where change of the measured value falls steeply, as a range where the indication marks exist, and excluding the detected range from an inspection target.

The above-described known techniques are premised on the fact that, in the circumferential direction of the tire, change of the surface height in a portion including the shape defect to be detected is comparatively gentle, while change of the surface height in a portion including the indication marks is steep.

CITATION LIST

Patent Literature

PTL 1: Japanese Unexamined Patent Application Publication No. 11-138654
PTL 2: Japanese Unexamined Patent Application Publication No. 2004-156919
PTL 3: Japanese Unexamined Patent Application Publication No. 5-215530

SUMMARY OF INVENTION

Technical Problem

FIG. 8 illustrates one example of the indication mark M on the sidewall surface of a tire in a coordinate system in which an X-axis and a Y-axis represent the radial direction and the circumferential direction of the tire, respectively.

In many cases, as illustrated in FIG. 8, the indication mark M rising from the tire surface has edges each extending in the circumferential direction of the tire (Y-direction) and edges each extending in a direction that forms an acute angle with respect to the circumferential direction of the tire. Therefore, the surface height measurement values of one line in the circumferential direction of the tire may include the measured values taken near the edges of the indication mark as represented by the measured values taken on a wavy line La in FIG. 8. In the surface height measurement values taken on the wavy line La in FIG. 8, change of the measured value caused by the indication mark M is comparatively gentle.

Accordingly, it is difficult to clearly distinguish the change of the measured value caused by the shape defect and the change of the measured value caused by the indication mark M from each other in the known shape defect inspection process in which the low-pass filtering or the smoothing differentiation is executed on the surface height measurement values of one line in the circumferential direction of the tire. As a result, a portion including the indication mark may be erroneously detected as a shape defect portion, or a shape defect portion may be erroneously recognized as a portion including the indication mark, thus leading to missing in detection of the shape defect.

In another case, as represented by the measured values taken on a wavy line Lb in FIG. 8, the surface height measurement values of one line in the circumferential direction of the tire may include measured values corresponding to plural raised portions Mt in one design of indication mark M, which is isolated from the others, and a not-raised portion Mb therebetween. The not-raised portion Mb can be regarded as a recessed portion within an indication range of the indication mark M.

The not-raised portion Mb positioned inside contours of the one design of indication mark M is preferably excluded from the target of the shape defect inspection because its height change tends to increase regardless of the shape defect (such as the bulge and the dent).

With the known shape defect inspection process, however, the measured values in the not-raised portion positioned inside the contours of the one design of indication mark are included in the target of the shape defect inspection, thus causing a problem that the not-raised portion may be erroneously detected as the shape defect portion.

Meanwhile, it is conceivable to, by using a processor, automatically detect, based on the surface height distribution information, the position of the indication mark M in the coordinate system defined for the surface height distribution information, and to automatically preset a region surrounding the indication mark M as a region that is to be excluded from the target of the shape defect inspection.

However, the process of automatically detecting the position of the indication mark M based on the surface height distribution information needs a high computation load of the processor. For that reason, automatically setting the region surrounding the indication mark M by the processor for each tire to be inspected raises a problem of impeding significant cutting of time, which is demanded in the tire inspection step. Another problem is that it is very difficult to, for all various types of tires having various surface shapes, automatically reliably set the region surrounding the indication mark M without exception.

It is also conceivable to previously register, as the region to be excluded from the target of the shape defect inspection, a particular region corresponding to the position of the indication mark M in the coordinate system for the surface height distribution information.

However, work of setting many regions one by one, which are to be excluded from the shape defect inspection, while confirming the position of each region corresponding to each of the indication marks M present in the sidewall surface of the tire, needs a lot of time and labor.

The present invention has been accomplished in view of the above-described state of art, and its object is to provide a tire shape inspection method and device which, when inspecting shape defects in a sidewall surface of a tire including embossed marks (indication marks) formed therein, can correctly measure the shape defects by reliably excluding, from surface height measurement values, those measured values taken in a range where the mark is formed, without misidentification.

Solution to Problem

To achieve the above object, according to a first invention of the present invention, there is provided a tire shape inspection method for executing a process of inspecting a shape defect in a sidewall surface of a tire in which embossed marks are formed, the tire shape inspection method including steps (1-1) to (1-6) as follows:

(1-1) A mask-range automatically setting step of automatically detecting a position of the embossed mark based on sample surface shape information that is given as the surface height distribution information obtained from a sample of the tire for each type of the tire to be inspected, and automatically setting coordinate information of a mask range surrounding a range where the embossed mark exists.

(1-2) An image outputting step of displaying a surface shape image, which is based on the sample surface shape information, and a mask range image, which is based on the coordinate information of the mask range, on a display unit in a superimposed relation.

(1-3) A mask range changing step of changing, in parallel to the image outputting step, the coordinate information of the mask range in accordance with a predetermined operation input entered through an operating unit.

(1-4) An information registration step of storing, in a storage unit, both the coordinate information of the mask range after being changed in the mask range changing step, and registered surface shape information that is part or the whole of the sample surface shape information.

(1-5) A coordinate-system deviation detection step of checking inspection-use surface shape information, which is given as the surface height distribution information obtained for each tire to be inspected, with the registered surface shape information, and detecting a deviation of a coordinate system between the inspection-use surface shape information and the coordinate information of the mask range.

(1-6) A mask-range inspection exclusion step of, after correcting the deviation of the coordinate system, excluding those surface height measurement values, which are included in the inspection-use surface shape information and which correspond to the coordinate information of the mask range, from a target of the shape defect inspection process.

Here, the surface height distribution information is information prepared by plotting the surface height measurement values at various positions over an entire circumferential range of the sidewall surface in a two-dimensional coordinate system, which has a first coordinate axis representing a radial direction of the tire and a second coordinate axis representing a circumferential direction of the tire.

The above-mentioned six steps are usually executed by a predetermined processor. Those six steps may be executed by separate processors, respectively. As an alternative, plural ones among the six steps may be executed by one processor. Of course, there is no particular limitation on the number of processors used and on how to share the six steps by the processors used when the tire shape inspection method according to the present invention is carried out.

In the tire shape inspection method according to the present invention, the above-mentioned step (1-1) includes the processing to automatically detect the positions of the embossed marks, and hence requires a comparatively high load of computation by the processor. According to the present invention, the above-mentioned steps (1-1) to (1-4) including the processing with a high load of computation need to be executed for one sample tire for each type of tire.

On the other hand, the processing of the above-mentioned steps (1-5) and (1-6) executed for each tire to be inspected (i.e., an inspection target) requires a comparatively low load of computation by the processor and can be executed at a high speed even with a widely used processor. Therefore, the tire shape inspection method according to the present invention does not impede cutting of time of the inspection step for each tire to be inspected.

It is very difficult to automatically reliably set the mask range surrounding the embossed mark without exception for all types of tires having various surface shapes by executing the above-described mask-range automatically setting step. By executing the mask range changing step, however, the automatically-set mask range can be corrected with a manual operation on the surface shape image of the sidewall surface while visually confirming the mask range. Therefore, the correct mask range can be reliably set for many types of tires having various surface shapes. In addition, the manual operation in the mask range changing process needs to be performed only on a deficient part of the automatically set mask range. Therefore, the manual operation in the mask range changing process is much simpler than the work of manually setting the mask ranges one by one for all of many embossed marks, which exist in the sidewall surface.

The surface height measurement values in the surface height distribution information are obtained by scanning the sidewall surface of the tire while the tire set to a predetermined rotary shaft is rotated. At that time, a scan starting position on the sidewall is generally not specified to a particular position. Further, a tire shape inspection apparatus usually does not have the function of detecting the orientation of the tire set to the rotary shaft, and recording the detection result. Accordingly, in the surface height distribution information obtained with the tire shape inspection apparatus, the correspondence relationship between a coordinate on a coordinate axis representing the circumferential direction of the tire and an actual position in the circumferential direction of the tire is not unified, namely different for each tire to be inspected. Hence, a deviation of the coordinate system has to be detected and corrected for the surface height distribution information obtained for each tire to be inspected with respect to the coordinate information of the mask range, which has been obtained with the mask range changing step.

With the tire shape inspection method according to the present invention, since the deviation of the coordinate system is automatically detected in the coordinate-system deviation detection step and the deviation of the coordinate system is corrected based on the detection result, the range to be excluded from the target of the shape defect detection process can be set correctly.

Preferably, the tire shape inspection method according to the present invention satisfies requirements of the following (1-7) and (1-8):

(1-7) The registered surface shape information is in form of the surface height measurement values, which are included in the sample surface shape information and which range entirely in a direction of the second coordinate axis at a particular coordinate on the first coordinate axis.

(1-8) The coordinate-system deviation detection step includes a step of detecting a deviation of the coordinate system in the direction of the second coordinate axis by checking the surface height measurement values, which are included in the inspection-use surface shape information and which range entirely in the direction of the second coordinate axis at the particular coordinate on the first coordinate axis, with the registered surface shape information while shifting a position in the direction of the second coordinate axis.

In many cases, the problematic deviation of the coordinate system is usually generated only in the direction of the coordinate axis representing the circumferential direction of the tire. Hence, the deviation of the coordinate system can be simply detected with the above-mentioned step (1-8).

Preferably, the tire shape inspection method according to the present invention satisfies requirements of the following (1-9) to (1-11):

(1-9) A two-dimensional edge detection step of detecting edges of the embossed marks with a two-dimensional edge detection process executed on the sample surface shape information, and storing detected two-dimensional edge distribution information in a storage unit.

(1-10) A labeling step of executing labeling on the two-dimensional edge distribution information, and storing label distribution information obtained with the labeling in the storage unit.

(1-11) A mask range setting step of setting coordinates of the mask range, which surrounds a range where the embossed mark exists, based on filet coordinates for each label value in the label distribution information, and storing the set coordinates in the storage unit.

In the two-dimensional edge detection step, the edges of the embossed marks are detected, for example, by successively executing two-dimensional smoothing differentiation and binarization on the surface height distribution information. Then, binary distribution information, which is resulted from the two-dimensional smoothing differentiation and the binarization, or corrected binary distribution information, which is obtained after executing a predetermined correction process on the binary distribution information, is detected as the two-dimensional edge distribution information. One example of the two-dimensional smoothing differentiation is two-dimensional Sobel filtering.

The two-dimensional edge detection step is a step of detecting the edges of the indication marks (embossed marks) by executing the edge detection process on the surface height distribution information in the form of two-dimensional information while it remains as two-dimensional information. As a result, even when the edges (contours) of the indication mark are formed to extend in any direction in the two-dimensional coordinates, the edges can be detected reliably. Be it noted that various types of two-dimensional differentiation can be optionally used in the two-dimensional edge detection process.

With the labeling, the same label value is set for each design of indication mark isolated from the others. Further, for each design of indication mark, coordinates representing a rectangular range surrounding the relevant indication mark with a minimum area (i.e., the filet coordinates for each label value) are detected in the mask range setting step. The labeling is a process of setting the same label value for each of connected pixels with respect to two-dimensional edge distribution information (binary distribution information) that can be regarded as binary image information.

With the mask range setting step, the mask range including a range where the indication mask exists, i.e., a range including those surface height measurement values to be excluded from the target of the shape defect inspection, is set based on the filet coordinates for each label value. As a result, the measured value of a not-raised portion located within the contours of one design of indication mark can be excluded from the target of the shape defect inspection, and the not-raised portion can be avoided from being erroneously recognized as a shape defect portion.

Preferably, the image outputting step includes a step of displaying a cursor image on the display unit.

Further, the mask range changing step preferably includes a step of moving a displayed position of the cursor image in accordance with the operation input, and changing the coordinate information of the mask range with respect to a coordinate corresponding to the displayed position of the cursor image. As a result, the coordinate information of the mask range can be changed with a simple operation made on the operating unit such as a mouse.

Preferably, the mask-range inspection exclusion step is a step of replacing those surface height measurement values, which are included in the inspection-use surface shape information and which fall within a range corresponding to the coordinate information of the mask range, with values interpolated based on those surface height measurement values falling outside the aforesaid range. The interpolated values are gently-changing values, e.g., values interpolated by using a straight line or a curve of secondary degree. As a result, the shape defect inspection process can be executed in the same algorithm regardless of the presence or the absence of the mask range.

As a practical example of the mask range interpolation step, the processor can calculate, per line in the direction of the second coordinate axis, interpolated values for those surface height measurement values falling within the mask range with straight-line interpolation based on those surface height measurement values, which are included in the surface height distribution information and which fall outside the mask range.

Preferably, the predetermined correction process executed on the binary distribution information includes dilation that is performed in the field of image processing.

As a result of the dilation, even when the contour of the indication mark includes a portion where rising (change) of the surface height is comparatively gentle, such a portion is recognized as a part of the contour of the indication mark and the label value is assigned reliably.

The present invention may be modified such that, in the mask range setting step, each rectangular range specified by the filet coordinates for each label value is set as the mask range.

However, it is preferable to more finely set the mask range for the reason that the rectangular range specified by the filet coordinates may include the range, which is to be handled as the mask range.

In the present invention, therefore, the labeling step preferably satisfies a requirement of the following (1-12), and the mask range setting step preferably includes steps of the following (1-13) to (1-14):

(1-12) The labeling step is a step of executing the labeling on the two-dimensional edge distribution information (binary distribution information) on an assumption that coordinates of opposite ends of the entire circumferential range are adjacent to each other, and storing the label distribution information obtained as a labeling result in the storage unit.

(1-13) A label presence pattern determination step of determining for each label value in the label distribution information, based on the filet coordinates of the label value, that a pattern of a presence range of the label value in the direction of the second coordinate axis is which one of preset three types of presence patterns, and storing a determination result in the storage unit.

(1-14) A per-line mask range setting step of setting, per line in the direction of the second coordinate axis, the coordinates of the mask range based on the determination result of the presence pattern and a position thereof for each label value existing on the relevant one line, and storing the set coordinates in the storage unit.

The preset three types of presence patterns are a first presence pattern in which the label values continuously exist thoroughly over the entire circumferential range, a second presence pattern in which the label values separately exist in a region containing one end of the entire circumferential range and a region containing the other end thereof, and a third presence pattern in which the label values are in other states.

More specifically, in the per-line mask range setting step, the processor may execute, per line in the direction of the second coordinate axis, processes of the following (1-15) to (1-17) depending on the determination result of the presence pattern:

(1-15) A process of, depending on the number of the label values, setting only positions where the label values exist to the mask range or setting one entire line in the direction of the second coordinate axis to the mask range is executed for the label values for which the determination result of the presence pattern is the first presence pattern.

(1-16) A process of setting, to the mask range, a range from each of opposite end positions of the entire circumferential range to a position of the label value farthest away from the corresponding one of the opposite end positions of the entire circumferential range in each of two halved ranges of the entire circumferential range is executed for the label values for which the determination result of the presence pattern is the second presence pattern.

(1-17) A process of setting, to the mask range, a range covering all the positions where the label values exist is executed for the label values for which the determination result of the presence pattern is the first presence pattern.

With the processing described above, as described later, a necessary minimum range corresponding to the range, which is positioned inside substantially the contours of the indication marks, is set as the mask range.

In general, the sidewall surface of the tire is basically curved in the direction of the first coordinate axis (i.e., the radial direction) regardless of the presence or the absence of the indication mark. Thus, when the sidewall surface is steeply curved, a curved portion of the sidewall surface may be erroneously detected as the edge of the indication mark with the two-dimensional Sobel filtering in the filtering step.

For that reason, the processor preferably executes processes of the following (1-18) and (1-19):

(1-18) A measured-value normalization step is executed in which, per line in the direction of the second coordinate axis, the surface height measurement values in the surface height distribution information are normalized based on an average value of the surface height measurement values of the relevant one line.

(1-19) In the two-dimensional edge detection step, the two-dimensional edge detection process is executed on the surface height distribution information including the surface height measurement values that have been normalized in the measured-value normalization step.

As a result, the curved portion having the original shape of the sidewall surface can be avoided from being erroneously detected as the edge of the indication mark.

The present invention also resides in a tire shape inspection apparatus for deriving the surface height distribution information regarding the sidewall surface of the tire, which is used in the shape defect inspection, with the tire shape inspection method according to the first invention.

More specifically, the tire shape inspection apparatus according to the present invention is a tire shape inspection apparatus for irradiating a sidewall surface of a relatively rotating tire with line light, the sidewall surface including embossed marks formed therein, picking up an image of the line light, and deriving, based on the picked-up image, the surface height distribution information that is used in the shape defect inspection of the tire, the apparatus including components of the following (2-1) to (2-9):

(2-1) A line light irradiation unit for emitting plural beams of line light in succession, in order to form one optical cutting line on the sidewall surface, from directions differing from a direction of detection height for the optical cutting line.

(2-2) An image pickup unit for picking up images of the plural beams of line light, emitted for irradiation of the sidewall surface, in a direction in which a principal ray in each of the plural beams of line light is regularly reflected by the sidewall surface.

(2-3) An optical-cutting-method shape detection unit for deriving the surface height distribution information over an entire circumferential range of the sidewall surface by detecting the optical cutting line in the image picked up by the image pickup unit.

(2-4) A mask-range automatically setting unit for automatically detecting a position of the embossed mark based on sample surface shape information that is given as the surface height distribution information obtained from a sample of the tire for each type of the tire to be inspected, and automatically setting coordinate information of a mask range surrounding a range where the embossed mark exists.

(2-5) An image outputting unit for displaying a surface shape image, which is based on the sample surface shape information, and a mask range image, which is based on the coordinate information of the mask range, on a display unit in a superimposed relation.

(2-6) A mask range changing unit for changing, in parallel to processing executed by the image outputting unit, the coordinate information of the mask range in accordance with a predetermined operation input entered through an operating unit.

(2-7) An information registration unit for storing, in a storage unit, both the coordinate information of the mask range after being changed by the mask range changing unit, and registered surface shape information that is part or the whole of the sample surface shape information.

(2-8) A coordinate-system deviation detection unit for checking inspection-use surface shape information, which is given as the surface height distribution information obtained for each tire to be inspected, with the registered surface shape information, and detecting a deviation of a coordinate system between the inspection-use surface shape information and the coordinate information of the mask range.

(2-9) A mask-range inspection exclusion unit for, after correcting the deviation of the coordinate system, excluding those surface height measurement values, which are included in the inspection-use surface shape information and which correspond to the coordinate information of the mask range, from a target of a shape defect inspection process.

The expression "relatively rotating tire" means the case where the tire is itself rotated with its rotation axis being a center, or the case where the line light irradiation unit and the image pickup unit are rotated about the rotation axis of the tire while the tire is itself kept fixed.

The tire shape inspection apparatus according to the present invention can provide similar operating advantages to those of the tire shape inspection method according to the present invention.

To achieve the above object, according to a second invention of the present invention, there is provided a tire shape inspection method for executing a process of inspecting a shape defect in a sidewall surface of a tire in which embossed marks are formed, the shape defect inspection process being executed based on surface height distribution information that is prepared by plotting surface height measurement values at various positions over an entire circumferential range (i.e., a range of 360° in the circumferential direction) of the sidewall surface in a two-dimensional coordinate system, which has a first coordinate axis representing a radial direction of the tire and a second coordinate axis representing a circumferential direction of the tire, the tire shape inspection method including steps of the following (3-1) to (3-4):

(3-1) A two-dimensional edge detection step of detecting edges of the embossed marks with a two-dimensional edge detection process executed on the surface height distribution information, and storing detected two-dimensional edge distribution information in a storage unit.

(3-2) A labeling step of executing labeling on the two-dimensional edge distribution information, and storing label distribution information obtained with the labeling in the storage unit.

(3-3) A mask range setting step of setting coordinates of the mask range, which surrounds a range where the embossed mark exists, based on filet coordinates for each label value in the label distribution information, and storing the set coordinates in the storage unit.

(3-4) A mask-range interpolation step of replacing those surface height measurement values, which are included in the surface height distribution information used in the shape defect inspection process and which fall within the mask range, with values interpolated based on those surface height measurement values falling outside the aforesaid range.

The surface height distribution information is information prepared by plotting the surface height measurement values at various positions over an entire circumferential range of the sidewall surface in a two-dimensional coordinate system, which has the first coordinate axis representing the radial direction of the tire and the second coordinate axis representing the circumferential direction of the tire.

In the two-dimensional edge detection step, the edges of the embossed marks are detected, for example, by successively executing two-dimensional smoothing differentiation and binarization on the surface height distribution information. Then, binary distribution information, which is resulted from the two-dimensional smoothing differentiation and the binarization, or corrected binary distribution information, which is obtained after executing a predetermined correction process on the binary distribution information, is detected as the two-dimensional edge distribution information. One example of the two-dimensional smoothing differentiation is two-dimensional Sobel filtering.

As a practical example of the mask range interpolation step, per line in the direction of the second coordinate axis, interpolated values for those surface height measurement values falling within the mask range may be calculated with straight-line interpolation based on those surface height measurement values, which are included in the surface height distribution information and which fall outside the mask range.

The plurality of steps carried out in the tire shape inspection method according to the present invention is usually executed by a predetermined processor, such as a computer. The plurality of steps may be executed by separate processors, respectively. As an alternative, the plurality of steps may be executed by one processor. Of course, there is no particular limitation on the number of processors used and on how to share the plurality of steps by the processors used when the tire shape inspection method according to the present invention is carried out.

According to the present invention, in the two-dimensional edge detection step, the edges of the indication marks (embossed marks) are detected by executing the edge detection process on the surface height distribution information in the form of two-dimensional information while it remains as two-dimensional information. As a result, even when the edges (contours) of the indication mark are formed to extend in any direction in the two-dimensional coordinates, the edges can be detected reliably. Be it noted that various types of two-dimensional differentiation can be optionally used in the two-dimensional edge detection process.

With the labeling, the same label value is set for each design of indication mark isolated from the others. Further, for each design of indication mark, coordinates representing a rectangular range surrounding the relevant indication mark with a minimum area (i.e., the filet coordinates for each label value) are detected in the mask range setting step. The labeling is a process of setting the same label value for each of connected pixels with respect to two-dimensional edge distribution information (binary distribution information) that can be regarded as binary image information.

With the mask range setting step, the mask range including a range where the indication mask exists, i.e., a range including those surface height measurement values to be excluded from the target of the shape defect inspection, is set based on the filet coordinates for each label value. As a result, the measured value of a not-raised portion located within the contours of one design of indication mark can be excluded from the target of the shape defect inspection, and the not-raised portion can be avoided from being erroneously recognized as a shape defect portion.

Further, with the mask range interpolation step, those measured values, which are included in the surface height distribution information and which fall within the mask range, are replaced with the values interpolated based on those measured values falling outside the mask range. The interpolated values are gently-changing values, e.g., values interpolated by using a straight line or a curve of secondary degree. As a result, the shape defect inspection process can be executed in the same algorithm regardless of the presence or the absence of the mask range.

Preferably, the predetermined correction process executed on the binary distribution information includes dilation that is performed in the field of image processing.

As a result of the dilation, even when the contour of the indication mark includes a portion where rising (change) of the surface height is comparatively gentle, such a portion is recognized as a part of the contour of the indication mark and the label value is assigned reliably.

The present invention may be modified such that, in the mask range setting step, each rectangular range specified by the filet coordinates for each label value is set as the mask range.

However, it is preferable to more finely set the mask range for the reason that the rectangular range specified by the filet coordinates may include the range, which is to be handled as the mask range.

In the present invention, therefore, the labeling step may satisfy a requirement of the following (3-5), and the mask range setting step may include steps of the following (3-6) and (3-7):

(3-5) The labeling step is a step of executing the labeling on the two-dimensional edge distribution information (binary distribution information) on an assumption that coordinates of opposite ends of the entire circumferential range are adjacent to each other, and storing the label distribution information obtained with the labeling in the storage unit.

(3-6) A label presence pattern determination step of determining for each label value in the label distribution information, based on the filet coordinates of the label value, that a pattern of a presence range of the label value in the direction of the second coordinate axis is which one of preset three types of presence patterns, and storing a determination result in the storage unit.

(3-7) A per-line mask range setting step of setting, per line in the direction of the second coordinate axis, the coordinates of the mask range based on the determination result of the presence pattern and a position thereof for each label value existing on the relevant one line, and storing the set coordinates in the storage unit.

The preset three types of presence patterns are a first presence pattern in which the label values continuously exist thoroughly over the entire circumferential range, a second presence pattern in which the label values separately exist in a region containing one end of the entire circumferential range and a region containing the other end thereof, and a third presence pattern in which the label values are in other states.

More specifically, in the per-line mask range setting step, processes of the following (3-8) to (3-10) are preferably executed, per line in the direction of the second coordinate axis, depending on the determination result of the presence pattern:

(3-8) A process of, depending on the number of the label values, setting only positions where the label values exist to the mask range or setting one entire line in the direction of the second coordinate axis to the mask range is executed for the label values for which the determination result of the presence pattern is the first presence pattern.

(3-9) A process of setting, to the mask range, a range from each of opposite end positions of the entire circumferential range to a position of the label value farthest away from the corresponding one of the opposite end positions of the entire circumferential range in each of two halved ranges of the entire circumferential range is executed for the label values for which the determination result of the presence pattern is the second presence pattern.

(3-10) A process of setting, to the mask range, a range covering all the positions where the label values exist is executed for the label values for which the determination result of the presence pattern is the first presence pattern.

With the processes described above, as described later, a necessary minimum range corresponding to the range, which is positioned inside substantially the contours of the indication marks, is set as the mask range.

In general, the sidewall surface of the tire is basically curved in the direction of the first coordinate axis (i.e., the radial direction) regardless of the presence or the absence of the indication mark. Thus, when the sidewall surface is steeply curved, a curved portion of the sidewall surface may be erroneously detected as the edge of the indication mark with the two-dimensional Sobel filtering in the filtering step.

For that reason, processes of the following (3-11) and (3-12) may be executed in the tire shape inspection method according to the present invention:

(3-11) A measured-value normalization step is executed in which, per line in the direction of the second coordinate axis, the surface height measurement values in the surface height distribution information are normalized based on an average value of the surface height measurement values of the relevant one line.

(3-12) In the two-dimensional edge detection step, the two-dimensional edge detection process is executed on the surface height distribution information including the surface height measurement values that have been normalized in the measured-value normalization step.

The "measured-value normalization step" stated in (3-12) is the same step as that defined in (3-1). As a result, the curved portion having the original shape of the sidewall surface can be avoided from being erroneously detected as the edge of the indication mark.

The surface height measurement values in the surface height distribution information can be obtained, as described in PTL 1, by picking up the image of the line light emitted for irradiation of the sidewall surface of the rotating tire, and performing shape detection with the optical cutting method based on the picked-up image. Further, the sidewall surface of the tire is highly glossy. In the shape detection with the optical cutting method, therefore, the image of the line light emitted for irradiation of the sidewall surface is preferably picked up in a direction in which a principal ray of the line light is regularly reflected by the sidewall surface. As a result, information based on a clear optical cutting line can be obtained.

In some cases, however, many recesses that are so small as not to become the target of the shape defect inspection are formed in the sidewall surface. When an image of the sidewall surface is picked up in the direction in which the principal ray of the line light is regularly reflected, the light reflected by the small recesses does not reach the image pickup unit. Hence, a clear and highly-bright image of the optical cutting line cannot be obtained for the positions corresponding to areas of the small recesses.

In view of the above point, processes of the following (3-13) to (3-15) may be executed in the tire shape inspection method according to the present invention:

(3-13) An optical-cutting-method shape detection step is executed by detecting an optical cutting line having brightness equal to or greater than a predetermined level from a picked-up image of line light emitted for irradiation of the sidewall surface of the rotating tire, and by deriving effective height detected values, which are plotted in the two-dimensional coordinate system and which correspond to positions of the optical cutting lines each having brightness equal to or greater than the predetermined level.

(3-14) A measured-value normalization step is executed, with respect to the surface height measurement values included in the surface height distribution information per line in the direction of the second coordinate axis, by setting, for a portion where the optical cutting line having brightness equal to or greater than the predetermined level has been detected, the effective height detected values in the aforesaid portion to a value normalized based on an average value of the effective height detected values of the relevant one line, and by setting, for other portion in the relevant one line, the value interpolated based on the effective height detected values of the relevant one line to the value normalized based on the average value of the effective height detected values of the relevant one line.

(3-15) In the two-dimensional edge detection step, the two-dimensional edge detection process is executed on the surface height distribution information including the surface height measurement values that have been normalized in the measured-value normalization step.

The "measured-value normalization step" stated in (3-15) is the same step as that defined in (3-4).

As a result, the curved portion having the original shape of the sidewall surface can be avoided from being erroneously detected as the edge of the indication mark. Further, for a portion for which a clear optical cutting line has not been detected in the picked-up image of the sidewall surface due to the small recesses, setting of an improper surface measured value can be avoided and hence erroneous detection of the shape defect can be avoided.

The value interpolated based on the effective height detected values is, for example, the average value of the effective height detected values of the one line in the direction of the second coordinate axis, or a value interpolated using a straight line.

In some of the tires, a belt-like projected or recessed mark is formed in the sidewall surface of the tire almost thoroughly in the circumferential direction. In some others of the tires, many projected or recessed marks are formed in the sidewall surface of the tire so as to lie on a line almost thoroughly in the circumferential direction. Hereinafter, the former mark is called an "annular mark", and the latter group of marks is called a "group of quasi-annular marks".

In the case of the annular mark being formed in the sidewall surface of the tire, when the height measured values in the surface height distribution information is normalized in the measured-value normalization step, there occurs a phenomenon that the height measured values after the normalization represent an erroneous shape differing from the actual shape of the sidewall surface of the tire near the position of a boundary line of the annular mark in the radial direction of the tire. This results in erroneous detection of the shape defect. Such a problem similarly arises in the case where the group of quasi-annular marks is formed in the sidewall surface of the tire.

In view of the above point, steps of the following (3-16) and (3-17) may be executed in the tire shape inspection method according to the present invention:

(3-16) An average height abruptly-changed coordinate detection step of detecting, for a data train in a direction of the first coordinate, which includes data of an average value of the effective height detected values per line in the direction of the second coordinate axis, an average height abruptly-changed coordinate which is a coordinate on the first coordinate axis and at which an absolute value of a differential value is equal to or greater than a preset threshold.

(3-17) A defect-inspection exclusion region setting step of excluding, from the target of the shape defect inspection process, a region spanning entirely in the direction of the second coordinate axis within a coordinate range having a predetermined width and containing the average height abruptly-changed coordinates on the first coordinate axis, which are included in the surface height distribution information.

As a result, even when the annular mark or the group of quasi-annular marks is formed in the sidewall surface of the tire, erroneous detection of the shape defect can be prevented.

The present invention further resides in a tire shape inspection apparatus for deriving the surface height distribution information regarding the sidewall surface of the tire, which is used in the shape defect inspection, with the tire shape inspection method according to the second invention.

More specifically, the tire shape inspection apparatus according to the present invention is a tire shape inspection apparatus for irradiating a sidewall surface of a relatively rotating tire with line light, the sidewall surface including embossed marks formed therein, picking up an image of the line light, and deriving, based on the picked-up image, the surface height distribution information that is used in the shape defection inspection of the tire, the apparatus including components of the following (4-1) to (4-4):

(4-1) A line light irradiation unit for emitting plural beams of line light in succession, in order to form one optical cutting line on the sidewall surface, from directions differing from a direction of detection height for the optical cutting line.

(4-2) An image pickup unit for picking up images of the plural beams of line light, emitted for irradiation of the sidewall surface, in a direction in which a principal ray in each of the plural beams of line light is regularly reflected by the sidewall surface.

(4-3) An optical-cutting-method shape detection unit for deriving the surface height distribution information over an entire circumferential range of the sidewall surface by detecting the optical cutting line in the image picked up by the image pickup unit.

(4-4) An embossed mark exclusion unit for excluding information of a range, in which the embossed mark exists, from the surface height distribution information used in the shape defect inspection of the tire for each type of the tire based on the two-dimensional edge detection process that is executed on the surface height distribution information.

The expression "relatively rotating tire" means the case where the tire is itself rotated with its rotation axis being a center, or the case where the line light irradiation unit and the image pickup unit are rotated about the rotation axis of the tire while the tire is itself kept fixed.

The tire shape inspection apparatus according to the present invention provides similar advantageous effects to those of the tire shape inspection method according to the present invention.

Advantageous Effects of Invention

According to the present invention, when inspecting the shape defects in the sidewall surface of the tire in which the embossed marks (indication marks) are formed, the shape defects can be correctly measured by reliably excluding, from the surface height measurement values, those measured values taken in the range where the mark is formed, without misidentification.

DESCRIPTION OF EMBODIMENTS

Embodiments of the present invention will be described below with reference to the accompanying drawings for understanding of the present invention. Be it noted that the following embodiments merely represent practical examples of the present invention and they will not restrict the technical scope of the present invention.

(First Invention)

First, an overall configuration of a tire shape inspection device W according to one embodiment of the first invention is described with reference to FIG. 1.

The tire shape inspection device W according to the first invention executes a shape measurement process of measuring a surface height distribution of a tire 1 by picking up, with a camera, an image of line light that is emitted for irradiation of a surface of the rotating tire 1, and by executing shape detection with an optical cutting method based on the picked-up image. The shape measurement process provides surface height distribution information that represents a distribution of the surface height measurement values at various positions over a range of 360° in the circumferential direction of the surface of the tire 1. A measurement target of the surface height distribution information is a tread surface or a sidewall surface of the tire 1.

Further, the tire shape inspection device W executes a process of inspecting the shape defect in the surface of the tire 1 based on the surface height distribution information obtained with the shape measurement process, or based on inspection-use surface height distribution information, i.e., information that is obtained by modifying, as required, part of the former surface height distribution information.

Figure 1:
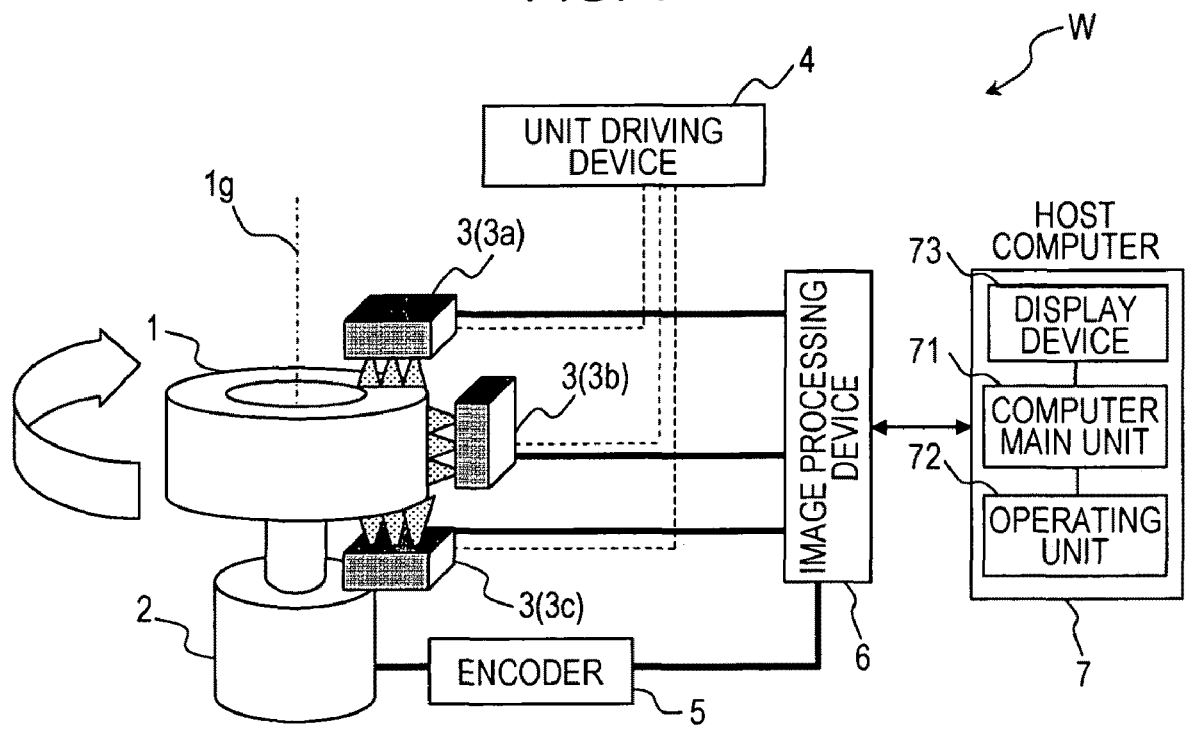
FIG. 1 is a block diagram of a tire shape inspection device W according to one embodiment of the first invention.

As illustrated in FIG. 1, the tire shape inspection device W includes a tire rotating machine 2, sensor units 3, a unit driving device 4, an encoder 5, an image processing device 6, a host computer 7, etc. The tire rotating machine 2 is a rotating device, such as a motor, for rotating the tire 1 about its rotation axis 1g, which is a target of the shape detection.

The tire rotating machine 2 rotates the tire 1 at a rotational speed of 60 rpm, for example. Thus, during one second in which the tire 1 is rotated once, the tire shape inspection device W detects the surface shapes of the tread surface and the sidewall surface of the tire 1 over an entire circumferential range by using the sensor units 3 described later.

The sensor units 3 are each a unit incorporating a light source for irradiating the surface of the rotating tire 1 with a beam of line light, a camera for picking up an image of the line light on the surface of the tire 1, and so on. This embodiment includes a total of three sensor units 3, i.e., sensor units 3a and 3c for use in the shape measurements of two sidewall surfaces of the tire 1, respectively, and one sensor unit 3b for use in the shape measurement of the tread surface of the tire 1.

Figure 2:
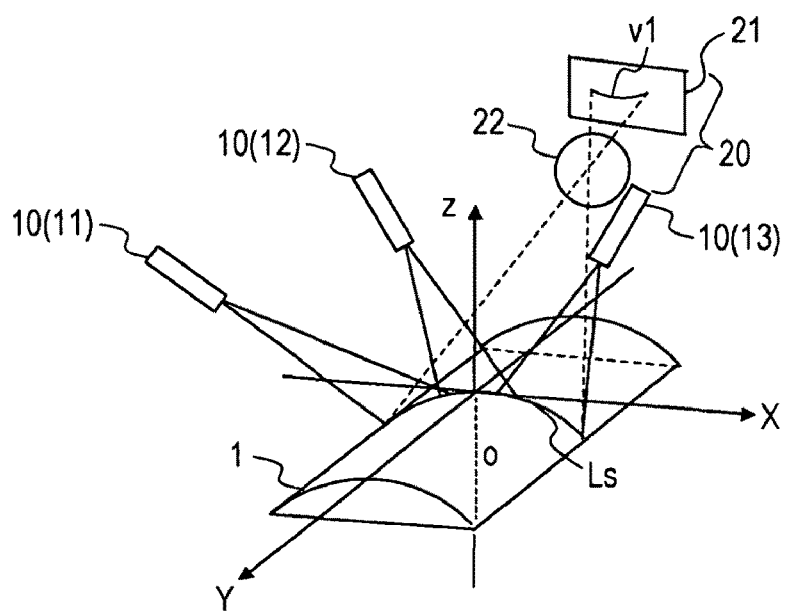
FIG. 2 illustrates a three-dimensional arrangement of light sources and a camera in a sensor unit that is provided in the tire shape inspection device W according to one embodiment of the first invention.

FIG. 2 illustrates an arrangement of components incorporated in each of the sensor units 3.

As illustrated in FIG. 2, the sensor unit 3 includes a light emitting device 10 for outputting plural beams of line light, and a camera 20.

In FIG. 2, an X-axis represents a direction tangential to the circumference of the tire rotation at a position where the shape of the tire 1 is detected, a Z-axis represents a direction of detection height at the position where the shape of the tire 1 is detected (i.e., a direction of surface height to be detected), and a Y-axis represents a direction orthogonal to both the X-axis and the Z-axis.

More specifically, in each of the sensor units 3a and 3c for use in the shape detection of the sidewall surfaces of the tire 1, the Z-axis is a coordinate axis representing the direction of the rotation axis 1g of the tire 1, and the X-axis is a coordinate axis representing the radial direction of the tire 1 (i.e., the direction normal to the direction of the rotation axis 1g of the tire 1). Also, in the sensor unit 3b for use in the shape detection of the tread surface of the tire 1, the Z-axis is a coordinate axis representing the radial direction of the tire 1, and the X-axis is a coordinate axis representing the direction of the rotation axis 1g of the tire 1.

Further, in each of the sensor units 3a, 3b and 3c, the Y-axis is a coordinate axis representing the circumferential direction of the tire 1. Be it noted that the correspondence relationship between the tire 1 and each coordinate axis may be changed depending on a manner of supporting the camera 20.

The light emitting device 10 includes a plurality (three in FIG. 2) of line light sources 11 to 13. In order that one optical cutting line is formed on one line Ls in the surface of the tire 1 by the plurality of line light sources 11 to 13, the light emitting device 10 emits plural beams of line light from directions differing from the direction of the detection height (i.e., the Z-axis direction) for the one line Ls (i.e., the optical cutting line) so as to continuously lie on the one line (namely, the light emitting device 10 emits the plural beams of line light to be overlapped at respective ends of adjacent beams of line light in a continuous relation such that the one line Ls is irradiated with one beam of line light as a whole).

The camera 20 includes a camera lens 22 and an image pickup element 21 (light receiving unit), and it picks up images v1 of the plural beams of line light impinging in a continuous relation upon the surface (i.e., the tread surface or the sidewall surface) of the tire 1 (namely, an image of the optical cutting line on the one line Ls).

Thus, with the sensor units 3a and 3c for the sidewall surfaces, in order that an optical cutting line (one continuous optical cutting line) is formed on one line Ls extending in the radial direction of the tire 1 (i.e., in the Y-axis direction) in the sidewall surface of the tire 1, the light emitting device 10 emits plural beams of line light from directions differing from the direction of the detection height (i.e., the Z-axis direction) for the one line Ls (i.e., the optical cutting line) so as to continuously lie on the one line.

On the other hand, with the sensor unit 3b for the tread surface, in order that an optical cutting line is formed on one line Ls extending in a direction orthogonal to the circumferential direction of the tire in the tread surface of the tire 1, the light emitting device 10 emits plural beams of line light from directions differing from the direction of the detection height (i.e., the Z-axis direction) for the one line Ls (i.e., the optical cutting line) so as to continuously lie on the one line.

While this embodiment illustrates the case of emitting three beams of line light for each surface of the tire 1 (in each sensor unit 3), each surface of the tire 1 may be irradiated with two beams of line light or four or more beams of line light by increasing or decreasing the number of line light sources 11 to 13.

The light emitting device 10 and the camera 20 are held by holding mechanisms (not shown) such that a view field range of the camera 20 exists in a direction in which respective principal rays (light propagating along a center line) in the plural beams of line light output from each of the line light sources 11 to 13 are regularly reflected by the surface of the tire 1. As a result, the camera 20 picks up respective images of the plural beams of line light in the directions in which the principal rays in the plural beams of line light are regularly reflected by the surface of the tire 1 (one example of the image pickup unit).

When a glossy tire surface is irradiated with line light, the intensity of regularly reflected light is greater than that of light reflected while scattering. With the above-described arrangement, therefore, a clear image of the line light emitted for irradiation of the tire surface can be obtained without enhancing the intensity of the line light even when the image of the line light is picked up at a sufficiently high image-pickup rate (e.g., 4000 or more frames per sec).

On the other hand, the unit driving device 4 (see FIG. 1) is a device for movably supporting each sensor unit 3 by using a driving device, e.g., a servo motor, as a driving source, and for properly positioning each sensor unit 3 with respect to the tire 1. In response to a predetermined operation made on an operating unit or a control command from an external device, the unit driving device 4 positions each sensor unit 3 to a predetermined retracted position spaced from the tire 1 before the tire 1 is attached to the tire rotating machine 2, and to a predetermined inspection position near the tire 1 after the new tire 1 has been attached to the tire rotating machine 2.

Further, the encoder 5 is a sensor for detecting a rotational angle of a rotary shaft of the tire rotating machine 2, i.e., a rotational angle of the tire 1. A signal detected by the encoder 5 is used to control the timing at which the camera in the sensor unit 3 picks up an image.

The image processing device 6 executes shutter control of the camera in the sensor unit 3 (i.e., control of the image-pickup timing) in accordance with the signal detected by the encoder 5. For example, whenever the encoder 5 detects that the tire 1 rotating at the speed of 60 rpm has rotated 0.09° (=360°/4000), the image processing device 6 makes control to release a shutter of the camera. As a result, the image is picked up at the image-pickup rate of 4000 frames per sec.

Further, the image processing device 6 receives the image picked up by the camera in the sensor unit 3, i.e., data of the picked-up image of the line light emitted for irradiation of the surface of the tire 1, executes the shape measurement process using the optical cutting method based on the picked-up image, and stores surface height distribution information (i.e., a set of the surface height measurement values of the tire 1), which is given as the measurement result, in an internal frame memory.

The image processing device 6 is realized with a DSP (Digital Signal Processor), for example. Be it noted that the shape measurement process using the optical cutting method is known in the art, and hence the description thereof is omitted here.

The surface height distribution information regarding the sidewall surface of the tire 1 is such information that the surface height measurement value for each of the positions in the circumferential range of 360° over the sidewall surface is plotted in a two-dimensional coordinate system, which has a first coordinate axis (X-axis in this embodiment) representing the radial direction of the tire 1 and a second coordinate axis (Y-axis in this embodiment) representing the circumferential direction of the tire 1.

Also, the surface height distribution information regarding the tread surface of the tire 1 is such information that the surface height measurement value for each of the positions in the circumferential range of 360° over the tread surface is plotted in a two-dimensional coordinate system, which has an X-axis representing the direction parallel to the rotation axis of the tire 1 and a Y-axis representing the circumferential direction of the tire 1.

Hereinafter, a range occupied by the surface height distribution information in the Y-axis direction (direction of the second coordinate axis), i.e., a Y-axis coordinate range corresponding to 360° in the circumferential direction of the tire 1, is called an "entire circumferential range Wy". The coordinates of opposite ends of the entire circumferential range Wy (i.e., the coordinate of a starting point and the coordinate of an ending point in the Y-axis direction) correspond to positions that are adjacent to each other in the circumferential direction on the actual surface of the tire 1.

Assuming that the surface height measurement value corresponds to a brightness value of each pixel in the image data, the surface height distribution information can be handled in a similar manner to monochromatic image data on the image processing device 6. Accordingly, the term "pixel" appearing in the following description is used as a term representing the position (coordinates) of each of the surface height measurement values in the above-described coordinate system of the X-axis and the Y-axis.

Figure 8:
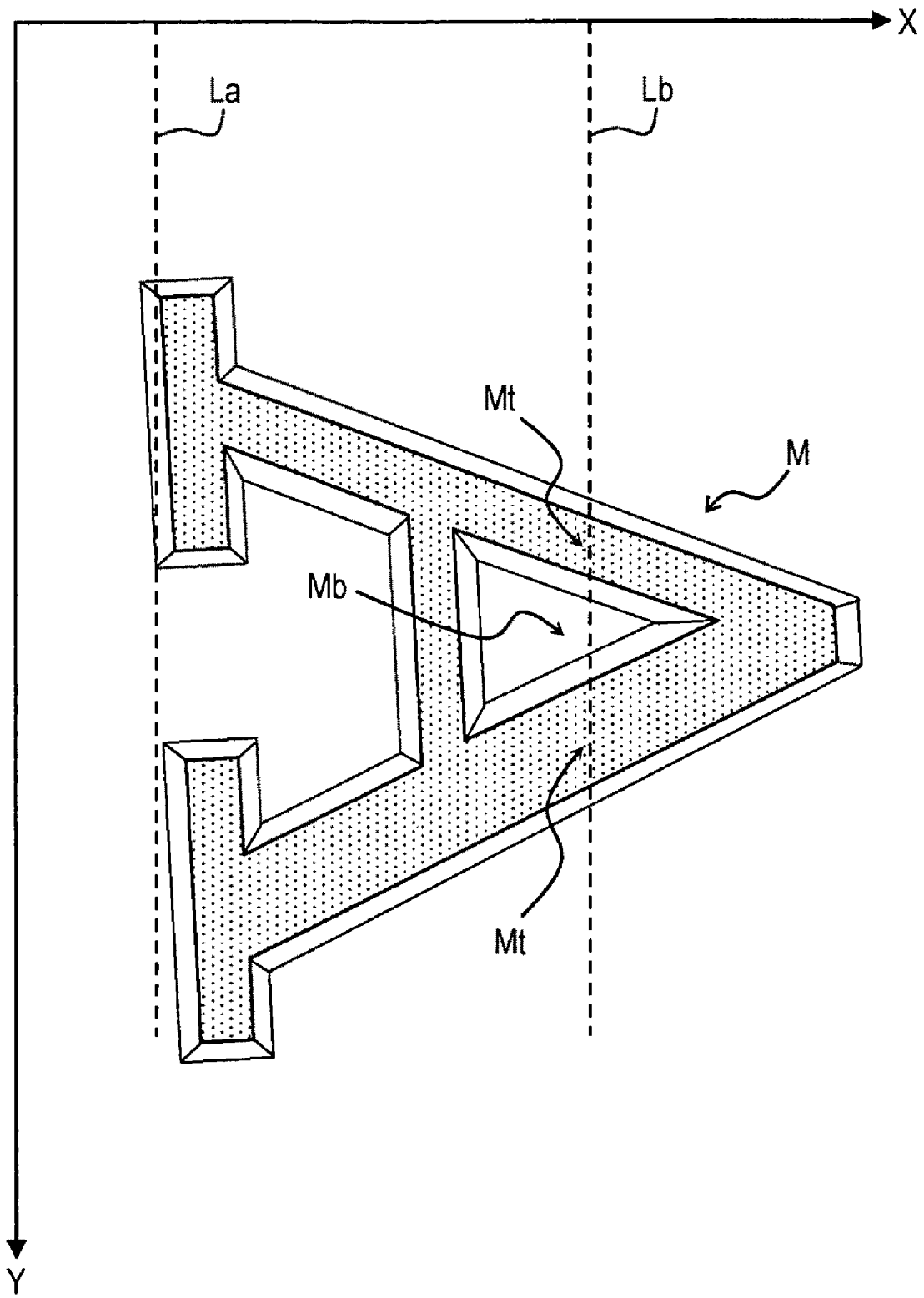
FIG. 8 illustrates an indication mark M on the sidewall surface of the tire.

Embossed marks (such as characters, symbols, and figures) are formed in the sidewall surface of the tire 1. Hereinafter, the embossed mark is called an indication mark M (see FIG. 8).

Further, the image processing device 6 executes a surface height distribution information modification process of replacing, for the surface height distribution information regarding the sidewall surface of the tire 1, those surface height measurement values within the range containing the indication mark M therein, which is to be excluded from the target of the shape defect inspection, with interpolated values that change gently. Then, the information regarding the sidewall surface, which has been obtained with the surface height distribution information modification process, and the surface height distribution information regarding the tread surface of the tire 1 are transferred as the inspection-use surface height distribution information to the host computer 7.

The host computer 7 includes a computer main unit 71, an operating unit 72, and a display device 73. The computer main unit 71 is a main unit of, e.g., a personal computer that includes a CPU, i.e., a processor for executing various types of data processing, a data storage unit such as a hard disk drive, etc. The operating unit 72 is a unit operated for inputting information, such as a keyboard and a mouse. The display device 73 is the so-called display for displaying character information, image information, etc., such as a liquid crystal display or a CRT display.

In the host computer 7, the CPU in the computer main unit 71 performs various types of computations and outputting of the computation results by executing programs that are previously stored in a memory.

More specifically, the host computer 7 executes the shape defect inspection process based on the inspection-use surface height distribution information regarding each surface of the tire 1, which is obtained from the image processing device 6. The shape defect inspection process is a process of determining whether the inspection-use surface height distribution information regarding each surface of the tire 1 satisfies an allowable condition preset for each surface of the tire 1, and displaying the determination result on a predetermined display portion or outputting it as a predetermined control signal.

Figure 3:
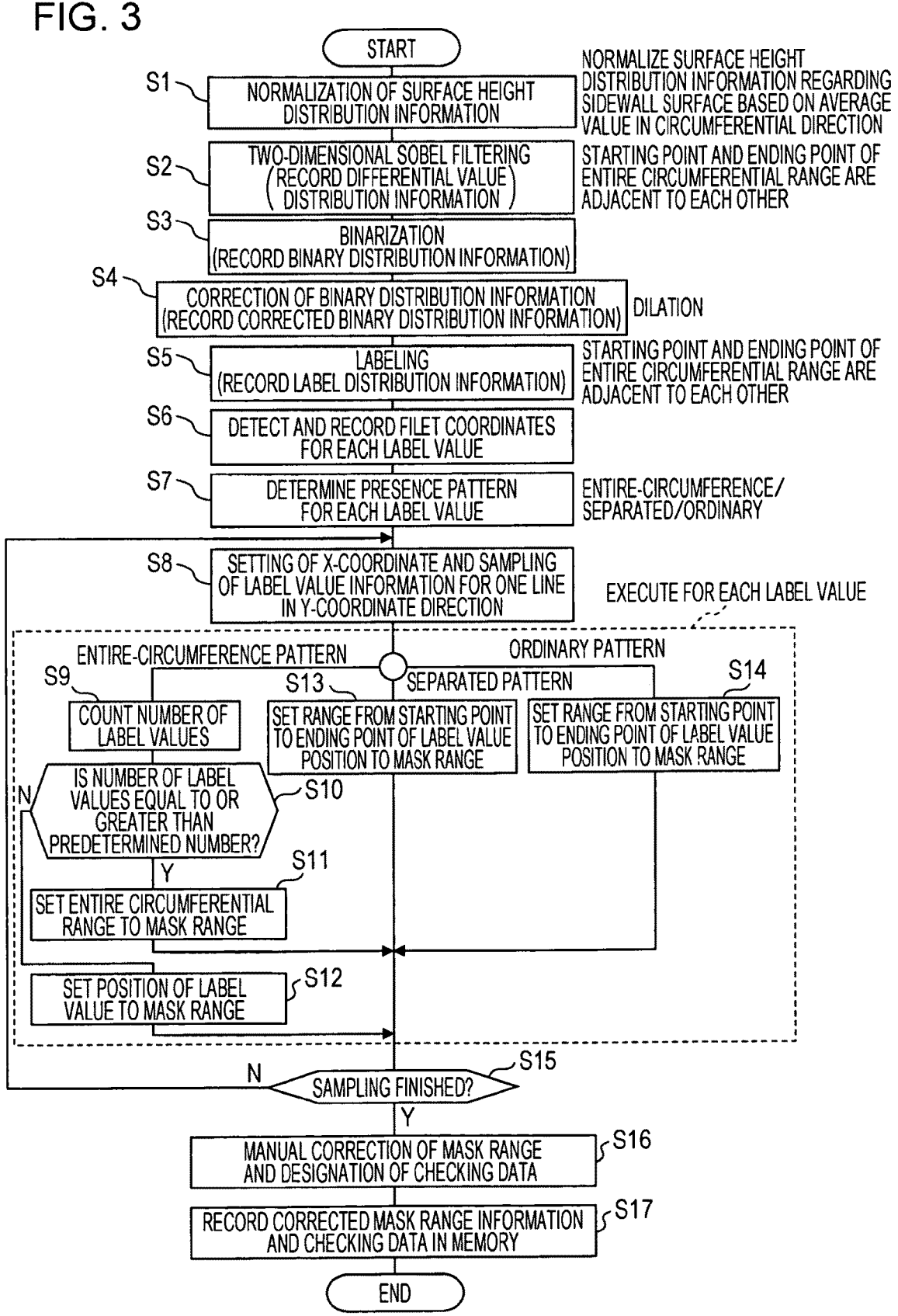
FIG. 3 is a flowchart illustrating one example of procedures of a mask range setting process in the tire shape inspection device W according to one embodiment of the first invention.

One example of procedures of a mask range setting process for the surface height distribution information regarding the sidewall surface of the tire, which is executed by the image processing device 6, and the host computer 7, will be described below with reference to a flowchart illustrated in FIG. 3. It is here assumed that, before the process illustrated in FIG. 3 is executed, the shape measurement process has been executed in the manner described above and the surface height distribution information regarding the sidewall surface of a sample of the tire 1 has been stored in the frame memory within the image processing device 6. S1, S2, etc. in the following description denote symbols for identifying processing procedures (steps).

The process illustrated in FIG. 3 is executed on the surface height distribution information that is obtained from a tire sample previously prepared for each type of tire as an inspection target. Thus, the processing of steps S1 to S17 illustrated in FIG. 3 is executed only for one sample tire preset for each type of the tire as the inspection target.

[Step S1]

First, the image processing device 6 executes a measured value normalization step (S1) for the surface height distribution information regarding the sidewall surface. More specifically, the image processing device 6 normalizes, per line in the Y-direction, the surface height measurement values in the relevant surface height distribution information based on an average value of the surface height measurement values of the one line, and stores the normalized surface height distribution information in the internal frame memory. Each value after the normalization is given, for example, as a value resulting from subtracting the average value from each of the surface height measurement values.

When the surface height distribution information includes a temporary measured value (e.g., zero) for the position where the optical cutting line with brightness equal to or greater than a predetermined level has not been detected, the image processing device 6 calculates the average value of the surface height measurement values except for the temporary measured value. Further, the image processing device 6 replaces, per line in the Y-axis direction, the temporary measured value included in the relevant one line with a value interpolated based on the other measured values, e.g., with the average value of the surface height measurement values.

The normalized values obtained with the processing of step S1 represent surface height information after excluding components corresponding to the curved shape in the radial direction (X-axis direction), i.e., to the original shape of the sidewall surface of the tire 1. It is also conceivable, for example, to preset an ideal shape of the sidewall surface in the radial direction on an assumption that the indication marks M are not present, and to set, as the normalized value, a value resulting from subtracting a value of the ideal shape from each of the surface height measurement values.

The image processing device 6 stores the surface height distribution information including the surface height measurement values, which have been normalized in the measured value normalization step (S1), in the memory to be used in the following processing of steps S2 to S15, and further transmits the same information to the host computer 7.

[Step S2]

Next, the image processing device 6 executes a filtering step (S2) of performing two-dimensional Sobel filtering on the surface height distribution information including the surface height measurement values that have been normalized in the measured value normalization step (S1), and storing gradient value distribution information, given as the filtering result, in the internal frame memory.

The Sobel filtering is a process of totalizing the results of multiplying respective values (normalized surface height measurement values) for a group of pixels in a predetermined number, which includes a certain target pixel and surrounding pixels, by coefficients preset depending on the positions of the pixels. Further, in the two-dimensional Sobel filtering, the multiplications of the coefficient and the totalizing of the multiplication results are performed by using two coefficient matrices that correspond respectively to the X-axis direction and the Y-axis direction, and the root of the square sum of both the totals is calculated as the processing result. Consequently, the processing result is obtained as a higher value as the surface height of the sidewall surface has a larger gradient. Hereinafter, the processing result for each pixel obtained with the two-dimensional Sobel filtering is called a "gradient value", and a set of respective gradient values of the pixels in the X-Y coordinate system is called "gradient value distribution information". Be it noted that the two-dimensional Sobel filtering is known in the art, and hence the detailed description thereof is omitted here.

Further, in the filtering step (S2), the Sobel filtering is executed on the premise that the coordinates (Y-coordinates) of the opposite ends of the entire circumferential range Wy are adjacent to each other in the Y-axis direction, thus enabling the gradient value to be obtained for each of pixels near the opposite ends of the entire circumferential range Wy.

In the two-dimensional Sobel filtering for the tire shape inspection, the gradient value of the target pixel is calculated based on values of a group of 9 pixels including the target pixel and surrounding 8 pixels, or values of a group of 25 pixels including the group of 9 pixels and surrounding 16 pixels.

[Step S3]

Then, the image processing device 6 executes a binarization step (S3) of binarizing the gradient value distribution information and storing the binary distribution information, given as the processing result, in the frame memory. With the binarization step, an ON value (e.g., 1) is set to a pixel of which value (gradient value) is equal to or greater than a preset threshold, and an OFF value (e.g., 0) is set to other pixels.

With the above-described processing of steps S1 to S3, even when the edges (contours) of the indication mark M are formed to extend in any direction in the two-dimensional coordinates, those edges can be detected reliably. Thus, steps S2 and S3 represent one example of a two-dimensional edge detection step of detecting the edges of the embossed indication mark M by executing a two-dimensional edge detection process (i.e., the two-dimensional Sobel filtering and the binarization) on the surface height distribution information, and storing the detection result (two-dimensional edge distribution information) in the frame memory.

Figure 4:
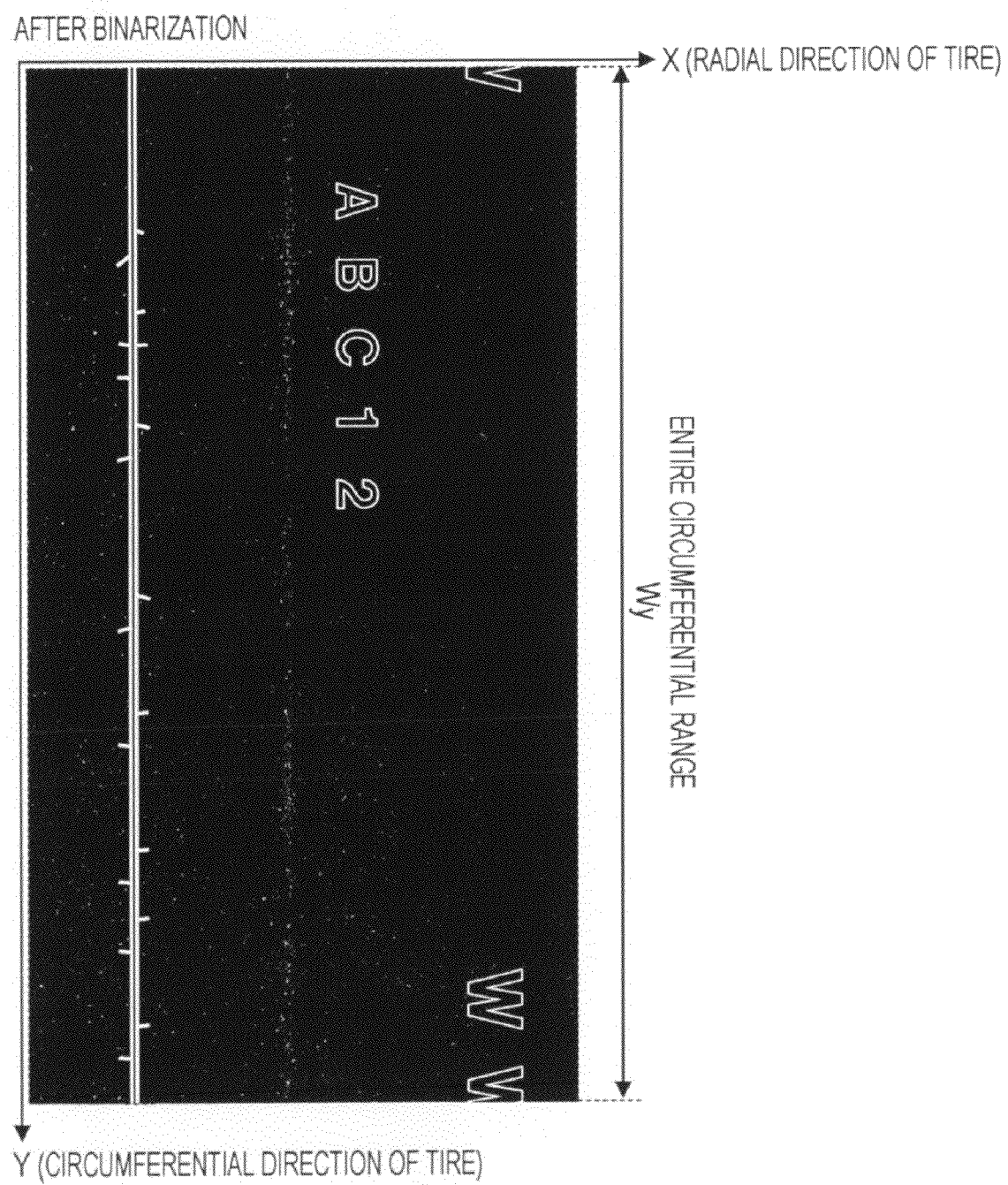
FIG. 4 illustrates, in the form of an image, one example of binary distribution information regarding a sidewall surface of a tire, which is obtained during the shape defect inspection.

FIG. 4 illustrates, in the form of an image, one example of the binary distribution information regarding the sidewall surface, which is obtained with the processing of step S3. In FIG. 4, a black region represents a region where the pixel in the binary distribution information has the OFF value (=0), and a white region represents a region where the pixel in the binary distribution information has the ON value (=1). In other words, the white region in FIG. 4 represents the edge of the indication mark M.

[Step S4]

Next, the image processing device 6 executes a binary distribution information correction step (S4) of performing a predetermined correction process on the binary distribution information, and storing information after the correction (i.e., corrected binary distribution information) in the frame memory.

More specifically, in step S4, the image processing device 6 executes the so-called dilation on the binary distribution information. The dilation is a process of, when at least one ON value (=1) exists near a certain target pixel (e.g., among 4 or 8 pixels surrounding the target pixel) in the binary distribution information that can be regarded as binary image information, the value of the relevant target pixel is corrected to the ON value (=1).

As a result of the dilation, even when the contour of the indication mark M includes a portion where rising (change) of the surface height is comparatively gentle, such a portion is recognized as a part of the contour of the indication mark M.

Figure 5:
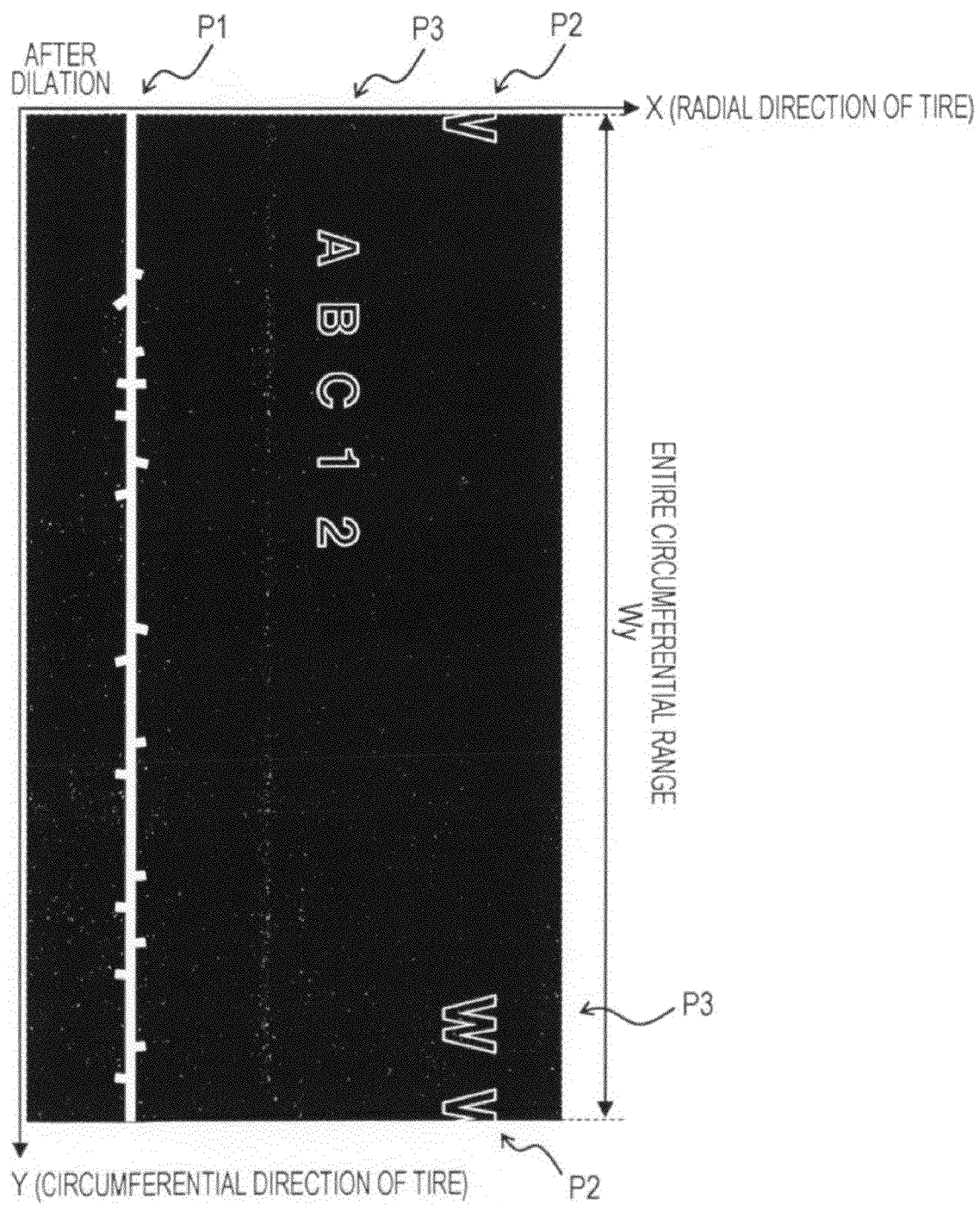
FIG. 5 illustrates, in the form of an image, one example of corrected binary distribution information regarding the sidewall surface of the tire, which is obtained during the shape defect inspection.

FIG. 5 illustrates, in the form of an image, the corrected binary distribution information after the dilation executed on the binary image information that has been obtained as an image illustrated in FIG. 4. In FIG. 5, a black region represents a region where the pixel in the corrected binary distribution information has the OFF value (=0), and a white region represents a region where the pixel in the corrected binary distribution information has the ON value (=1). In other words, the white region in FIG. 5 represents the edge of the indication mark M.

The known process of excluding an isolated point may be performed prior to the dilation, as part of the above-described correction process, so that noises caused by small extraneous matters, small projections, etc. on the sidewall surface, will not be increased.

[Step S5]

Next, the image processing device 6 executes a labeling step (S5) of performing labeling on the corrected binary distribution information that has been obtained with the processing of step S4, and storing label distribution information, given as the labeling result, in the frame memory. The labeling is the known process of assigning the same label for each of connected pixels, and the label distribution information is information resulting from setting the label value to a value of each pixel that has the ON value (=1) in the corrected binary distribution information.

In this step S5, as in the above-described step S2, the labeling is executed on the premise that the coordinates (Y-coordinates) of the opposite ends of the entire circumferential range Wy are adjacent to each other in the Y-axis direction. As a result, even when connected pixels corresponding to the edge of the indication mark M are separated (disconnected) to the starting end side and the terminating end side of the entire circumferential range Wy due to the starting position of the shape measurement process, the same label value is set to those pixels.

As an alternative, the labeling may be executed in step S5 on the binary distribution information before the correction, which has been obtained with the processing of step S3, by omitting the binary distribution information correction step in step S4.

[Step S6]

Next, the image processing device 6 executes a filet coordinate detection step (S6) of detecting, for each label value in the label distribution information obtained with the processing of step S5, filet coordinates of the relevant label value, and storing the filet coordinates in the predetermined internal memory. The filet coordinates are, as known in the art, coordinates representing a rectangular range surrounding a group of pixels (connected pixels) having the same label value with a minimum area.

[Steps S7 to S14]

Next, the image processing device 6 executes a mask range setting step (S7 to S14) of setting, based on the filet coordinates of the label value which have been obtained in step S6, coordinates of a mask range including the range where the indication mark M exists, and storing the set coordinates in the internal memory. The term "mask range" means a range surrounding, for each group of pixels to which the same label value is set in the label distribution information, the relevant group of pixels.

Details of the mask range setting step will be described below.

[Step S7]

First, the image processing device 6 executes a label presence pattern determination step (S7) of determining, for each label value in the label distribution information, that a pattern of the label-value presence range in the Y-direction (circumferential direction) is which one of preset three types of presence patterns, based on the filet coordinates of the relevant label value (i.e., of the connected pixels), and storing the determination result in the internal memory.

Figure 6:
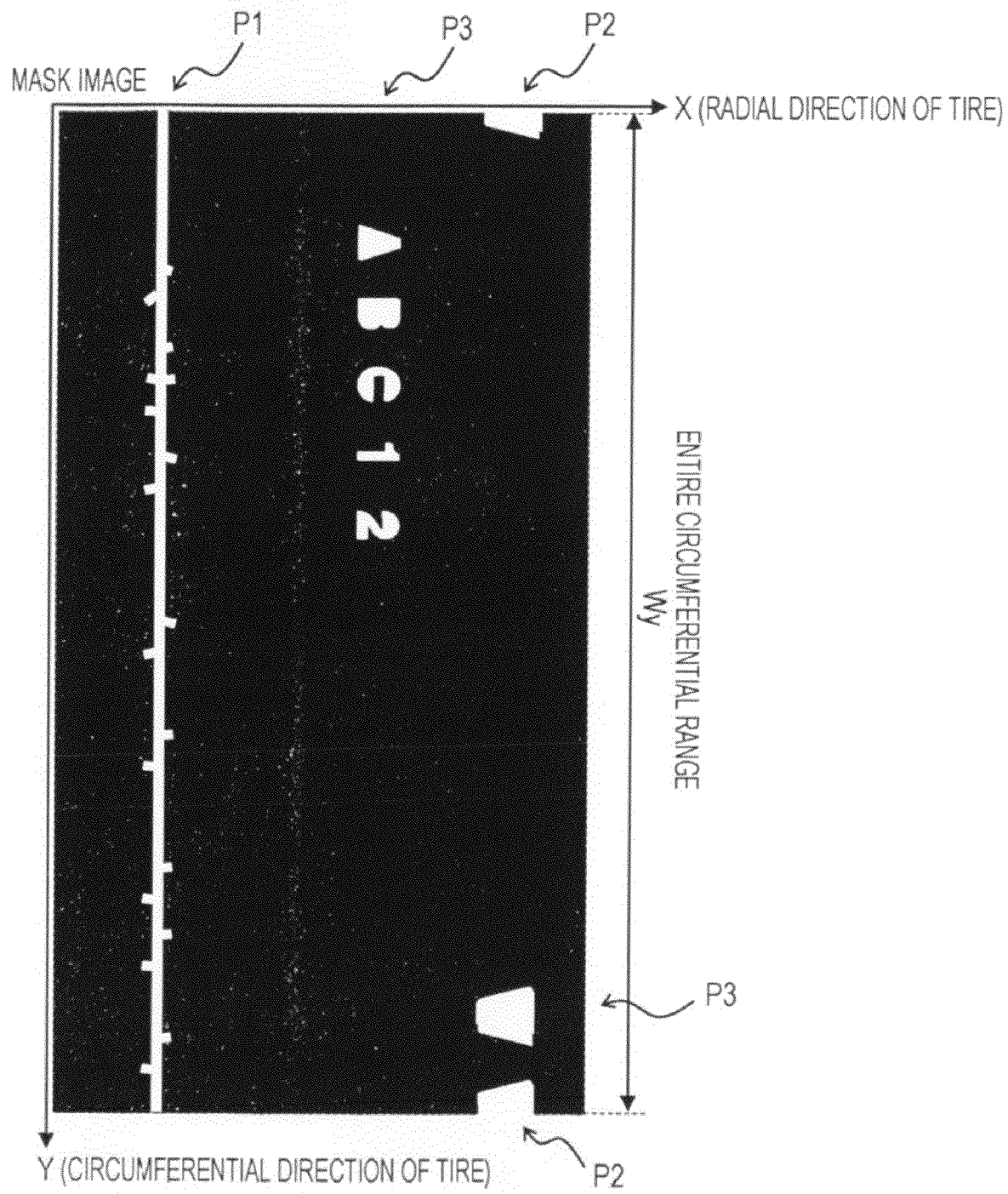
FIG. 6 illustrates, in the form of a binary image, one example of a mask range for the sidewall surface of the tire, which is set during the shape defect inspection.

The three types of presence patterns are the following three patterns P1 to P3. Images corresponding to those patterns P1 to P3 are illustrated in FIG. 6.

The first one is an entire-circumference pattern P1 (corresponding to the first presence pattern) in which the label value exists continuously over the entire circumferential range Wy.

The second one is a separated pattern P2 (corresponding to the second presence pattern) in which the label value exists separately in a region containing the starting end (one end) of the entire circumferential range Wy and a region containing the terminating end (the other end) thereof.

The third one is an ordinary pattern P3 (corresponding to the third presence pattern) in which the label value is in the other state than those of the entire-circumference pattern and the separated pattern.

For example, the image processing device 6 determines, for a certain target label value, whether the starting end and the terminating end in the Y-axis direction of the range represented by the filet coordinates coincide respectively with the starting end and the terminating end of the entire circumferential range Wy. If the coincidence is determined, the image processing device 6 determines whether the target label value exists in both ranges defined by dividing the entire circumferential range Wy into two equal parts. If the determination result shows that the target label value exists in both the ranges, the image processing device 6 determines that the target label value is in the entire-circumference pattern. If not so, the image processing device 6 determines that the target label value is in the separated pattern.

Further, if the starting end and the terminating end in the Y-axis direction of the range represented by the filet coordinates of the target label value do not coincide respectively with the starting end and the terminating end of the entire circumferential range Wy, the image processing device 6 determines that the target label value is in the ordinary pattern.

[Step S8]

Next, the image processing device 6 sets (selects) the X-axis coordinate one by one and samples (selects), from among the label distribution information stored in the frame memory, information of the label values of one line in the Y-axis direction at the set X-axis coordinate, as information for use in a process of setting the mask range (S8). After this step, the image processing device 6 executes the following processing of steps S9 to S14 whenever the information of the label values of one line in the Y-axis direction is sampled.

The X-axis coordinates set for the above-described sampling may be all of the coordinates (pixels) in the range occupied by the surface height distribution information in the X-axis direction or part of the coordinates (pixels) extracted at predetermined intervals depending on the spatial resolution that is required for the shape defect inspection. So long as the set X-axis coordinates are in the range of the spatial resolution allowable for the shape defect inspection, the X-axis coordinates are preferably set at larger intervals from the viewpoint of reducing the computation load.

Next, the image processing device 6 executes a per-line mask range setting step (S9 to S12, S13 or S14) of setting, per line in the Y-axis direction which has been sampled in step S8, coordinates of the mask range on the relevant one line in the Y-axis direction based on the respective determination results of the presence pattern of the label values existing on the relevant one line and the positions of the label values, and storing the set coordinates in the internal memory. A practical example of the per-line mask range setting step will be described below.

[Steps S9 to S12]

First, if the presence pattern (determination result) of the target label value is the entire-circumference pattern P1 (first presence pattern), the image processing device 6 counts the number of the target label values (S9) and determines whether the count number is equal to or greater than a preset number (setting number) (S10).

If it is determined that the count number of the target label values is equal to or greater than the setting number, the image processing device 6 sets the entire one line in the Y-axis direction (i.e., the entire circumferential range Wy), which is sampled at that time, to the mask range (S11).

On the other hand, if it is determined that the count number of the target label values is less than the setting number, the image processing device 6 sets only the positions where the target label values exist on the one line in the Y-axis direction, which is sampled at that time, to the mask range (S12).

[Step S13]

Meanwhile, if the presence pattern (determination result) of the target label value is the separated pattern P2 (second presence pattern), the image processing device 6 sets, to the mask range, a range from each of the opposite ends of the entire circumferential range Wy to the position of the target label value farthest away from the corresponding one of the opposite ends (i.e., from the starting end position or the terminating end position) of the entire circumferential range Wy in each of two halved ranges of the entire circumferential range Wy (S13).

More specifically, in the range from the starting end position to the mid position of the entire circumferential range Wy, a range starting from the relevant starting end position and ending at the position of the target label value nearest to the mid position is set to the mask range. Further, in the range from the mid position to the terminating end position of the entire circumferential range Wy, a range starting from the position of the target label value nearest to the mid position and ending at the relevant terminating end position is set to the mask range.

[Step S14]

Further, if the presence pattern (determination result) of the target label value is the ordinary pattern P3, the image processing device 6 sets, to the mask range, a range covering all the positions where the target label values exist (S14).

More specifically, a range starting from the position of the target label value nearest to the starting end position of the entire circumferential range Wy and ending at the position of the target label value nearest to the terminating end position of the entire circumferential range Wy is set to the mask range.

The above-described processing of steps S9 to S14 is executed for each same label value on the sampled one line in the Y-axis direction, and a range resulting from taking logical OR of the mask ranges set for each label value is set to a final mask range in the relevant one line.

[Step S15]

Thereafter, the image processing device 6 makes control such that the above-described processing of steps S8 to S14 is repeated until the sampling (S8) of all the X-axis coordinates is finished (S15). As a result, coordinate information of all the mask ranges regarding the sidewall surface of the sample of the tire 1 is obtained.

Then, the image processing device 6 transfers the coordinate information of all the mask ranges regarding the sidewall surface of the sample of the tire 1 to the host computer 7, which executes the shape defect inspection process by using the transferred coordinate information.

As described above, the image processing device 6 automatically detects the position of the indication mark M, i.e., the embossed mark, based on the surface height distribution information obtained from the sample of the tire 1 (S2 to S6), and further automatically sets the coordinate information of the mask range surrounding the presence range of the indication mark M (S7 to S15). The processing of steps S2 to S15 executed by the image processing device 6 is one example of the mask-range automatically setting step. Also, the image processing device 6 is one example of the processor.

[Step S16]

However, it is very difficult to automatically reliably set the mask range surrounding the indication mark M without exception for all types of tires 1 having various surface shapes by the above-described mask-range automatically setting step (S2 to S15).

In view of such a difficulty, the host computer 7 executes a process of correcting the coordinate information of the mask range, which has been automatically set in the mask-range automatically setting step (S2 to S15), in accordance with an operation of an operator.

More specifically, after receiving the normalized surface height distribution information and the coordinate information of the mask range, the host computer 7 executes a mask-range manual correction process and a checking-data designation process as follows (S16). In the following description, the surface height distribution information obtained from the sample of the tire 1 is called "sample surface shape information". The sample surface shape information is the normalized surface height distribution information that is transmitted from the image processing device 6 to the host computer 7 in step S1.

The mask-range manual correction process is a process that is executed in parallel to an image outputting process and a mask range changing process, which will be described below.

The image outputting process is a process of displaying a surface shape image of the sidewall surface of the tire 1, which is based on the sample surface shape information, and a mask range image, which is based on the coordinate information of the mask range, on the display device 73 in a superimposed relation.

Also, the mask range changing process is a process of changing (correcting) the coordinate information of the mask range in accordance with an operation input entered through the operating unit 72.

Figure 10:
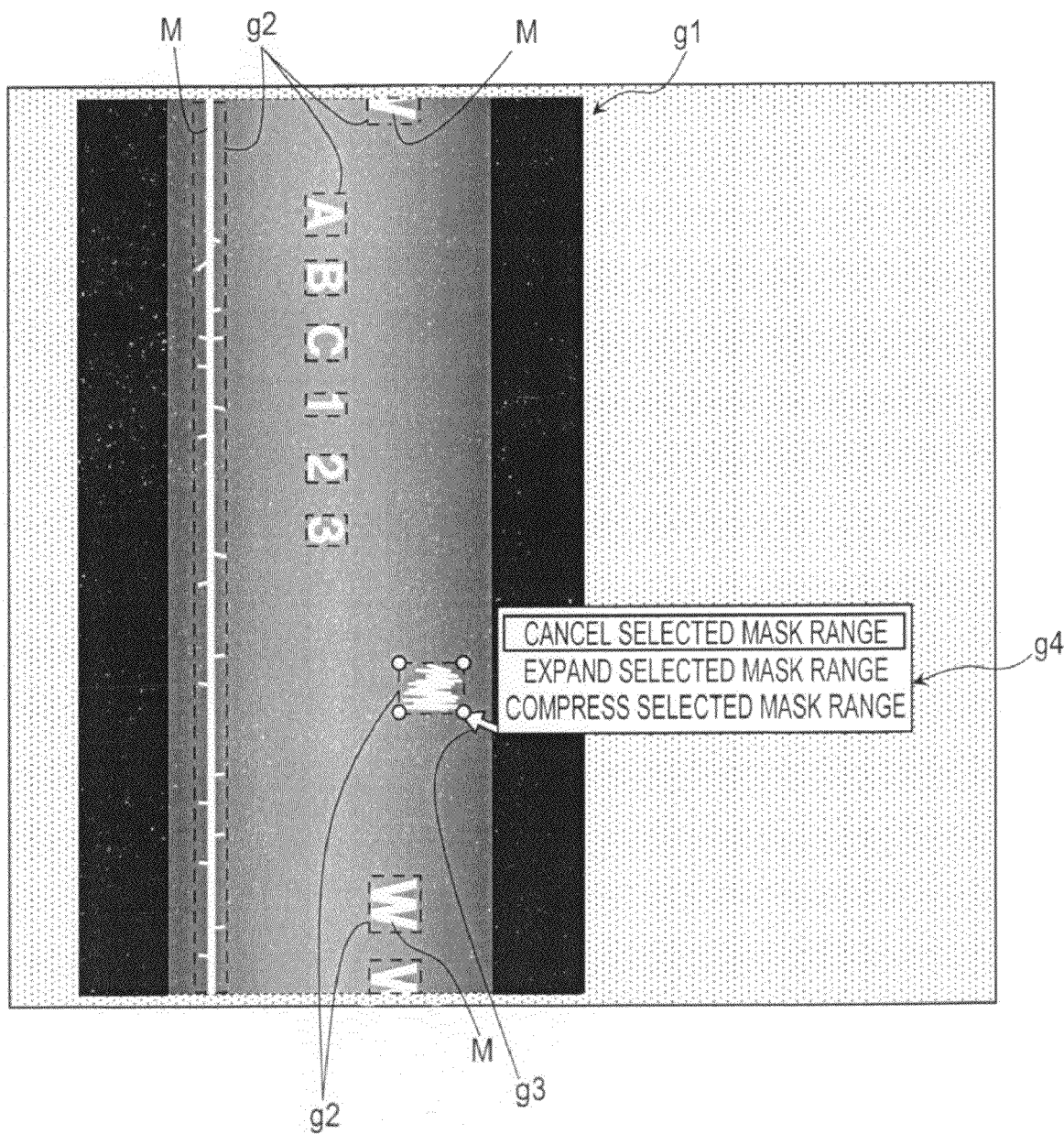
FIG. 10 illustrates a first example of a screen image displayed through an image outputting process in the tire shape inspection device W according to one embodiment of the first invention.
Figure 11:
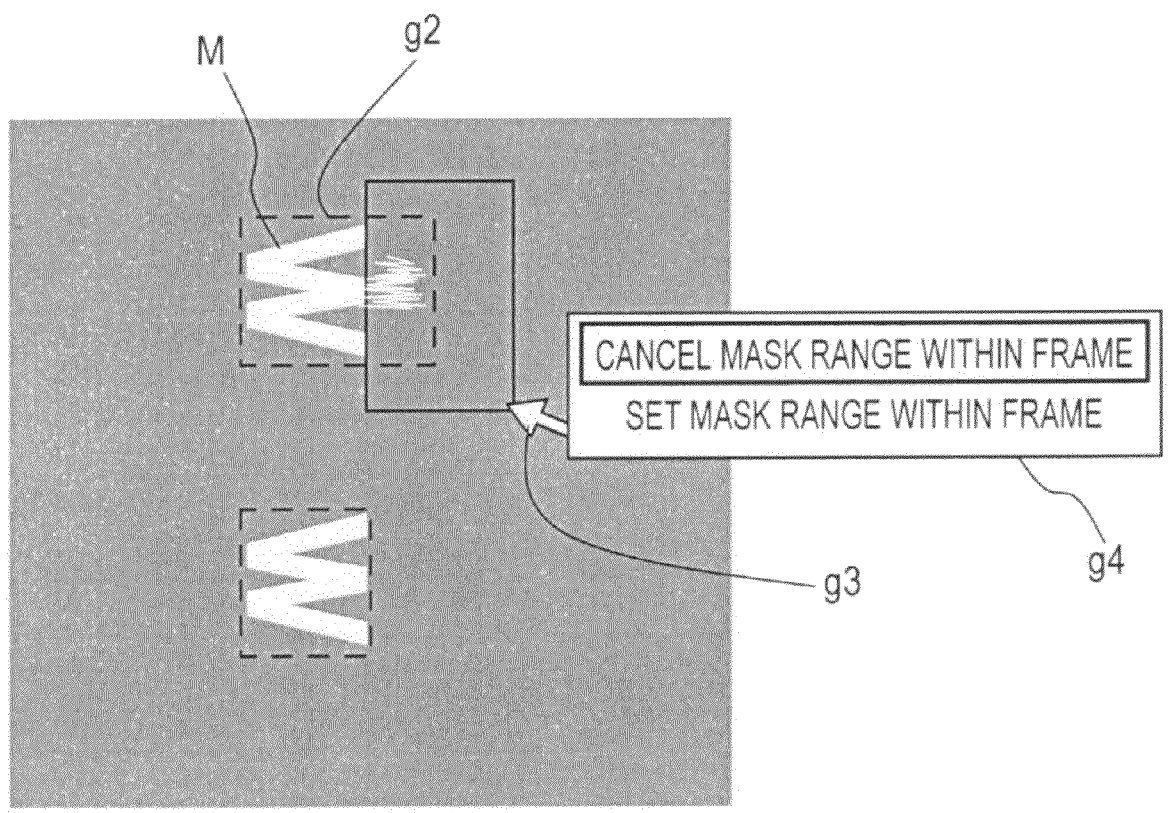
FIG. 11 illustrates a second example of the screen image displayed through the image outputting process in the tire shape inspection device W according to one embodiment of the first invention.

FIGS. 10 to 13 illustrate respectively first to fourth examples of a screen image displayed by the display device 73 through the image outputting process. FIG. 11 is an enlarged view of a part of the displayed screen image.

As illustrated in FIG. 10, the host computer 7 displays a surface shape image g1, which is based on the sample surface shape information, and a mask range image g2, which is based on the coordinate information of the mask range, on the display device 73 in a superimposed relation.

The surface shape image g1 is, for example, an image in which a level of brightness or a displayed color of the corresponding pixel differs depending on the magnitude of the surface height measurement value in the sample surface shape information.

Further, the mask range image g2 is, for example, an image of frame lines forming the contours of the mask range, and an image filling the mask range with a predetermined color. The mask range image g2 illustrated in FIG. 10 is an image in which the frame lines forming the contours of the mask range are denoted by broken lines.

Through the image outputting process, the operator of the host computer 7 can visually confirm the automatically-set mask range on the surface shape image g1 of the sidewall surface of the tire.

Additionally, as illustrated in FIG. 10, the host computer 7 displays, in the image outputting process, a cursor image g3, whose displayed position is moved in accordance with an operation input entered through the operating unit 7, on the display device 73 in a superimposed relation to the surface shape image g1. The host computer 7 moves the displayed position of the cursor image g3 in accordance with the operation of a mouse in the operating unit 7, for example.

Moreover, the host computer 7 changes, in the mask range changing process, the coordinate information of the mask range with respect to the coordinates corresponding to the displayed position of the cursor image g3. A practical example of the mask range changing process will be described below.

As illustrated in FIG. 10, by way of example, the host computer 7 executes a process of selecting the mask range corresponding to the displayed position of the cursor image g3, and adding designated change to the information of the selected mask range through an operation made on the operating unit 72. For example, the host computer 7 executes a process of canceling the selected mask range, a process of expanding the selected mask range, or a process of compressing the selected mask range. Herein, "cancellation of the mask range" means that the relevant range is set as the range not to be excluded from the target of the shape defect inspection process.

As a result, when the mask range is automatically set in a portion other than the indication mark M by a mistake for the reason, for example, that the sample of the tire 1 has the shape defect in its sidewall surface, the setting of the relevant mask range can be canceled.

Further, as illustrated in FIG. 11, the host computer 7 executes a process of canceling the setting of the mask range for only a portion of the already-set mask range, which overlaps with a range designated by an operation moving the cursor image g3.

As a result, when the mask range is automatically set in a range larger than the range to be set in a normal condition for the reason, for example, that the indication mark M and the shape defect are present close to each other in the sidewall surface of the sample of the tire 1, an extra part of the relevant mask range can be canceled to be excluded from the setting.

Figure 12:
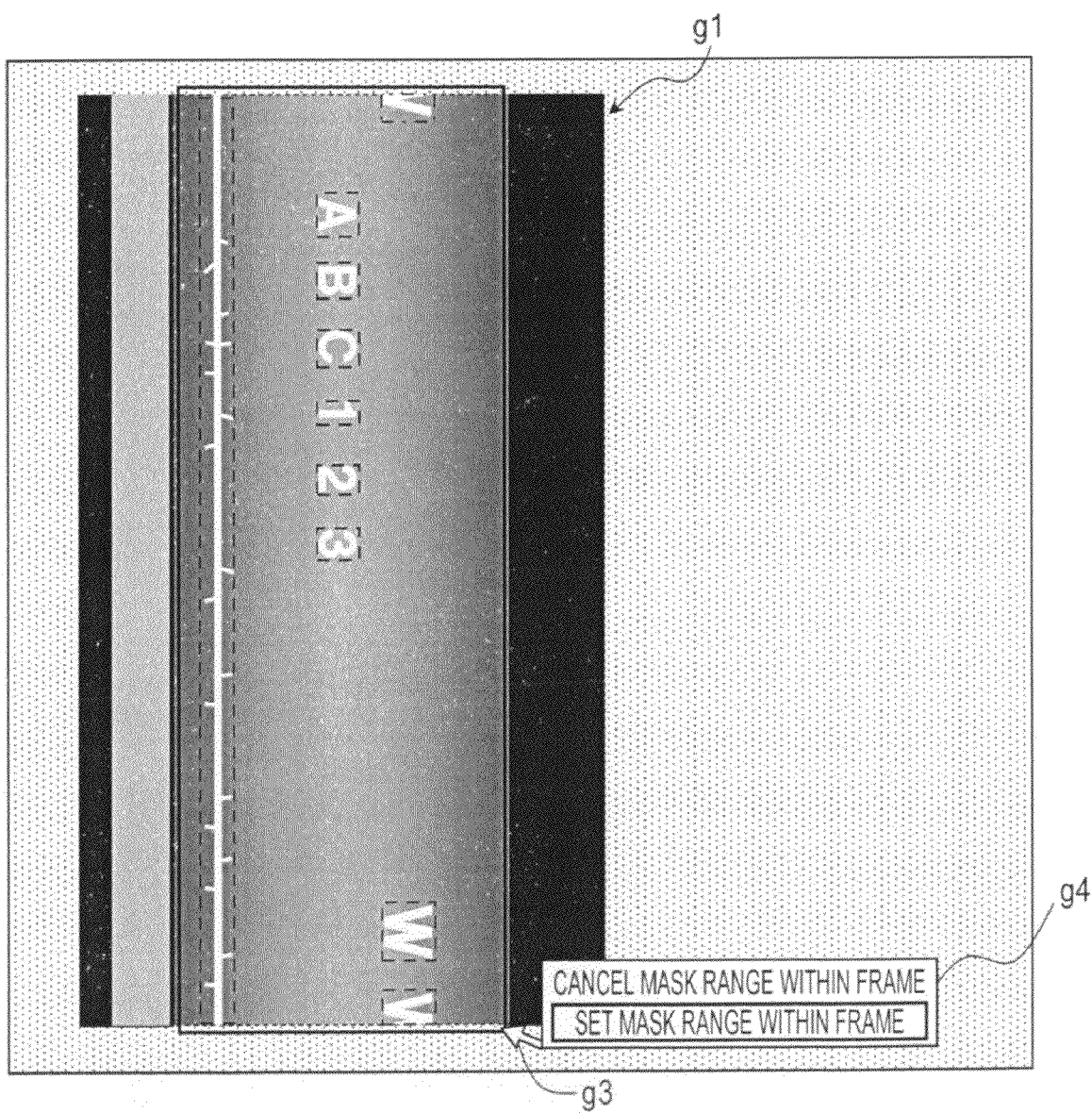
FIG. 12 illustrates a third example of the screen image displayed through the image outputting process in the tire shape inspection device W according to one embodiment of the first invention.

Still further, as illustrated in FIG. 12, the host computer 7 executes a process of setting, as the mask range, the other range than that designated by the operation of moving the cursor image g3.

As a result, when the surface height distribution information includes, for example, information of the other portions, such as the tread surface and the rim of the tire, than the sidewall surface, those extra portions can be excluded from the range as the inspection target.

As described above, the manual operation in the mask range changing process needs to be performed only on a deficient part of the automatically set mask range. Therefore, the manual operation in the mask range changing process is much simpler than the work of manually setting the mask ranges one by one for all of many embossed marks, which exist in the sidewall surface.

Moreover, the host computer 7 executes the checking-data designation process in addition the above-described mask range manual correction process. The checking-data designation process is a process of specifying checking data, which includes the surface height measurement values in part of the surface height distribution information regarding the sample of the tire 1 and the coordinate information of the those measured values, in accordance with an operation input entered through the operating unit 72, and recording the specified checking data in a data storage unit within the computer main unit 7. The surface height measurement values included in the checking data represent one example of the registered surface shape information.

Figure 13:
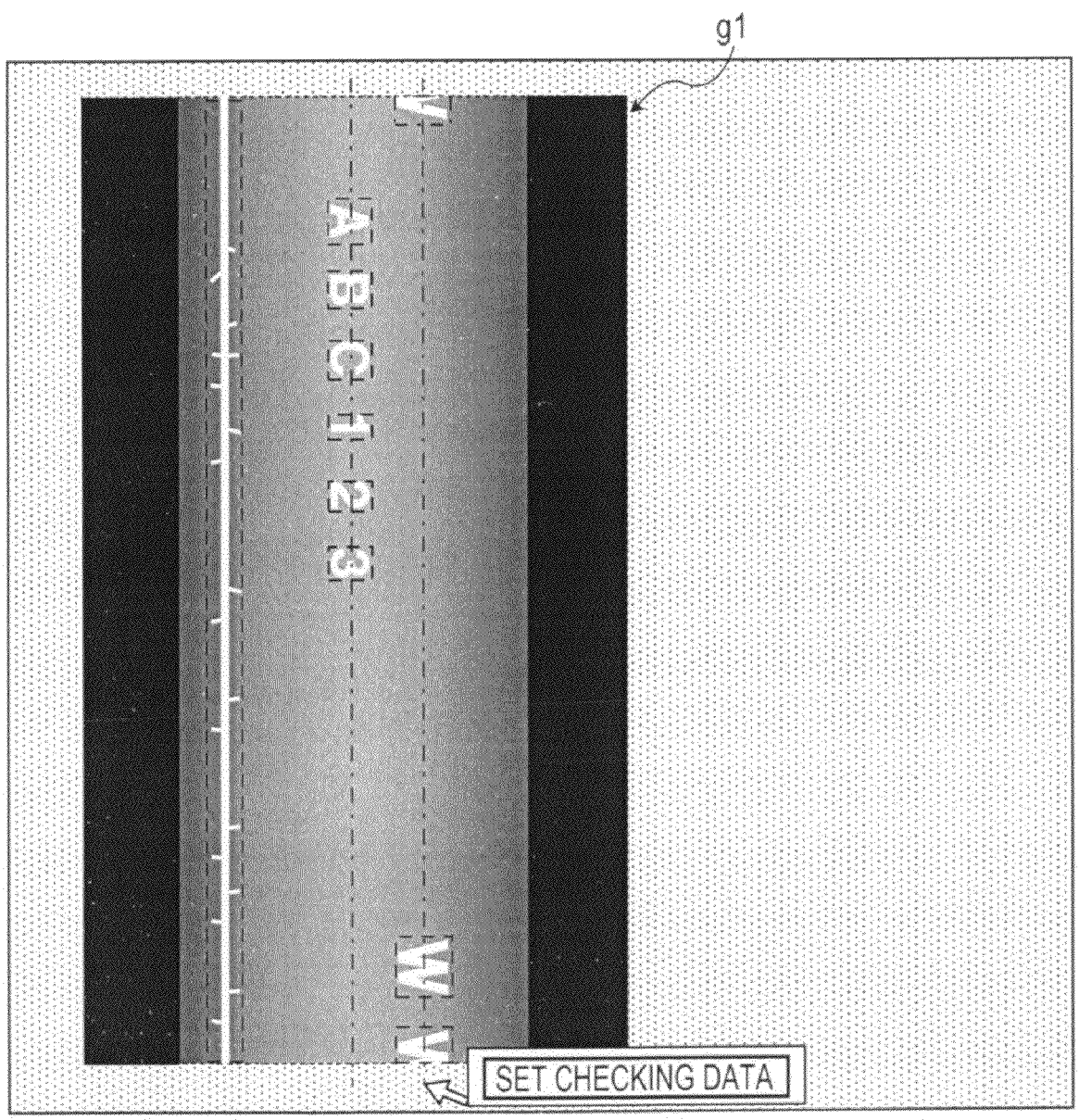
FIG. 13 illustrates a fourth example of the screen image displayed through the image outputting process in the tire shape inspection device W according to one embodiment of the first invention.

As illustrated in FIG. 13, by way of example, the host computer 7 records, for one or plural particular coordinates in the X-axis direction which are specified through the operation of moving the cursor image g3 and the operation of confirming the destination of the cursor movement, the surface height measurement values of one line in the Y-axis direction and their coordinate values at each of the specific coordinates, as the checking data, in the data storage unit. Hereinafter, the particular coordinates are called "checking position coordinates". The surface height measurement values of one line in the Y-axis direction means the surface height measurement values taken along one line extending thoroughly in the Y-axis direction.

A one-dot-chain line illustrated in FIG. 13 is displayed on the display device 73 in a superimposed relation to the surface shape image g1, and it represents positions where the surface height measurement values included in the checking data are plotted. The checking data is designated as data corresponding to a specific embossed portion in the sidewall surface of the tire 1.

The checking data is used to detect a deviation between the coordinate system for the coordinate information of the mask range and the coordinate system for the surface height distribution information obtained for each tire 1 as the inspection target.

FIG. 13 illustrates an example in which one or plural sets of data of one line in the Y-axis direction are set as the checking data. As another example, the checking data may be all of the surface height distribution information for the sample of the tire 1, or data within a two-dimensional partial region designated by an operation input.

[Step S17]

Then, the host computer 7 records the corrected coordinate information of the mask range and the checking data, which have been obtained through the mask-range manual correction process and the checking-data designation process (S16), in the data storage unit within the computer main unit 71 in a way correlated to an identification code representing the type of the tire 1 (S17). The mask range setting process is thereby completed.

Figure 9:
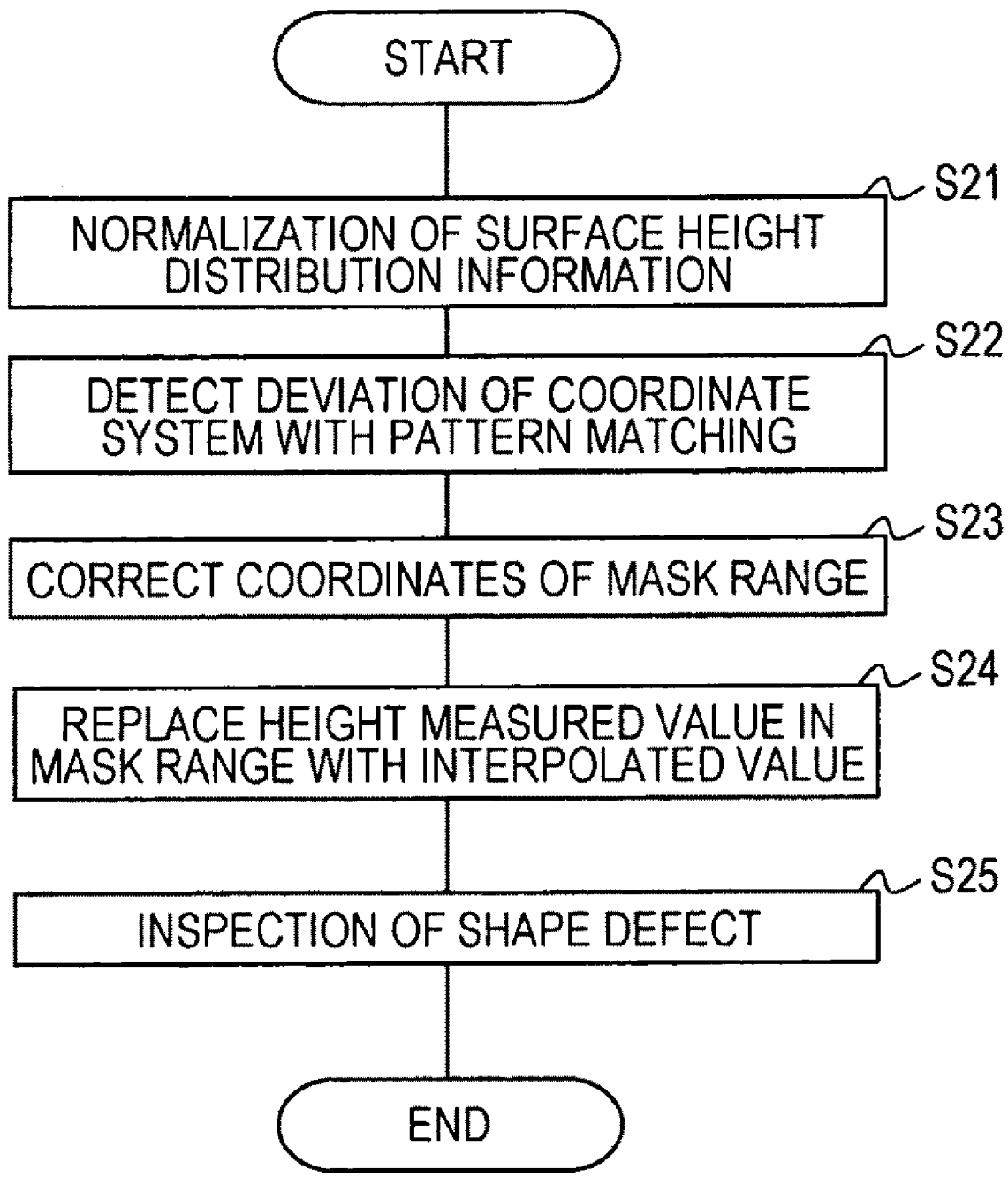
FIG. 9 is a flowchart illustrating one example of procedures of a shape defect inspection process in the tire shape inspection device W according to one embodiment of the first invention.

Next, one example of procedures of the shape defect inspection process executed by the image processing device 6 and the host computer 7 for each tire 1 as the inspection target will be described below with reference to a flowchart illustrated in FIG. 9. It is here assumed that before the process illustrated in FIG. 9 is executed, the shape measurement process has been executed in the manner described above and the surface height distribution information regarding the sidewall surface of each tire 1 as the inspection target has been stored in the frame memory within the image processing device 6.

[Step S21]

First, as in step S1 described above, the image processing device 6 executes a measured value normalization step (S1) for the surface height distribution information regarding the sidewall surface.

[Steps S22, S23]

Next, the image processing device 6 executes a process of detecting a deviation of the coordinate system between the surface height distribution information, which has been obtained for each tire 1 as the inspection target, and the coordinate information of the mask range, which has been obtained from the sample of the tire 1 and received from the host computer 7 (S22, coordinate-system deviation detection step). Hereinafter, the surface height distribution information obtained for each tire 1 as the inspection target is called "inspection-use surface shape information".

As a matter of course, the tire 1 as the inspection target and the sample of the tire 1, from which the coordinate information of the mask range has been obtained to be used in the inspection, are of the same type. Prior to the processing of step S22, the host computer 7 searches for the coordinate information of the mask range and the checking data, which have been obtained from the tire 1 of the same type as the tire 1 as the inspection target, based on the identification code representing the type of the tire 1, and delivers the search result to the image processing device 6.

In step S22, the image processing device 6 checks the surface height measurement values of one line in the Y-axis direction, which are included in the inspection-use surface shape information and which have been taken at the checking position coordinate in the X-axis direction, with the surface height measurement values of one line in the Y-axis direction, which are included in the checking data, while shifting the position in the Y-axis direction, and detects, as the deviation of the coordinate system in the Y-axis direction, a shift width at which discrepancies between both the measured values is minimized. When the checking data includes plural sets of the surface height measurement values of one line in the Y-axis direction, a shift width at which a total of the discrepancies obtained for all the sets is minimized is detected as the deviation of the coordinate system in the Y-axis direction.

Then, the image processing device 6 corrects the coordinate information of the mask range so that the deviation of the coordinate system, detected in step S22, is eliminated (S23).

[Step S24]

Next, the image processing device 6 executes a mask range interpolation step (S24) as follows.

In the mask range interpolation step, the image processing device 6 first calculates, per line in the Y-axis direction, interpolated values for those surface height measurement values, which fall within the mask range, based on those surface height measurement values, which are included in the inspection-use surface shape information and which fall outside the mask range. The interpolated values are gently-changing values and are typically interpolated by using a straight line, but they may be interpolated by using a curve of secondary degree as another example.

Further, the image processing device 6 replaces, per line in the Y-axis direction, those surface height measurement values, which are included in the inspection-use surface shape information stored in the frame memory and which fall within the mask range, with the interpolated values for the relevant surface height measurement values, and stores the replaced values in the frame memory. Thus, the inspection-use surface shape information after the interpolation, i.e., the inspection-use surface shape information after the process of replacing the surface height measurement values falling within the mask range with the interpolated values, is used in the shape defect inspection process executed by the host computer 7.

[Step S25]

Then, the host computer 7 executes the shape defect inspection process (S25) for the sidewall surface of the tire 1 in accordance with the predetermined rules by using the inspection-use surface shape information after the interpolation. One example of the shape defect inspection process will be described below. Be it noted that the following example does not represent the feature of the present invention.

First, the host computer 7 samples (selects), from among the inspection-use surface shape information after the interpolation, the information of the measured values (which may partly contain the interpolated values) of one line in the Y-axis direction to be a target of the shape defect inspection.

Next, the host computer 7 calculates a first index value, which is described below by way of example, as an index value for a local concave/convex defect (i.e., the bulges and the dent).

Low-pass filtering is first performed on the measured values of one line in the Y-axis direction through FFT with a preset number of orders (e.g., 50 orders) or less.

Then, for the measured values after the low-pass filtering, an angular range of about 7° is set as a window and the window is scanned over an angular range of 360°, which corresponds to all of those measured values, to calculate a difference between a maximum value and a minimum value among the measured values within each window range. The calculated difference is set to the first index value. When the first index value exceeds a predetermined value, it is determined that the relevant tire has the shape defect.

Further, the host computer 7 calculates a second index value, which is described below by way of example, as an index value for defect inspection (also called "Runout inspection") with respect to gentle concave/convex change over the entire circumference of the tire.

Low-pass filtering is first performed on the measured values of one line in the Y-axis direction through FFT with a preset number of orders (e.g., 15 orders) or less.

Then, a difference between a maximum value and a minimum value among all the measured values after the low-pass filtering is calculated and set to the second index value. When the second index value exceeds a predetermined value, it is determined that the relevant tire has the shape defect.

When only partial coordinates (lines) within the range occupied by the inspection-use surface shape information in the X-axis direction are designated as an inspection target region, the processing of step S25 is executed only on the inspection-use surface shape information corresponding to the designated lines. The inspection target region may be designated, for example, in a similar way to the above-described designation of the checking data (see FIG. 13).

FIG. 6 illustrates, in the form of a binary image, one example of the mask range set based on the corrected binary distribution information, which has been obtained as the image illustrated in FIG. 5, through the processing of steps S8 to, S16. In FIG. 6, a white region indicates the mask range.

In the tire shape inspection device W described above, the normalized surface height distribution information in the form of two-dimensional information is subjected to the known Sobel filtering while it remains as two-dimensional information (S2). Accordingly, even when the edges (contours) of the indication mark M are formed to extend in any direction in the two-dimensional coordinates, the edges can be detected reliably.

Further, with the labeling (S5), the same label value is set for each of edges of one design of indication mark M isolated from the others. The mask range to be excluded from the target of the shape defect inspection is set based on the filet coordinates (for each same label value) of those edges (S6 to S14). Accordingly, the measured value of the not-raised portion located within the contours of the indication mark M is also excluded from the target of the shape defect inspection, and the relevant not-raised portion can be avoided from being erroneously detected as a shape defect portion. As seen from one example illustrated in FIG. 6, regions within the contours of the indication marks M, such as characters "A", "B" and "W", are each set to be included in the mask range.

Moreover, in the tire shape inspection device W, the measured values within the mask range, which are included in the inspection-use surface shape information, are replaced with the interpolated values that change gently (S24). Therefore, even when the shape defect inspection process is executed in the same algorithm regardless of the presence or the absence of the mask range, the shape within the mask range can be avoided from being erroneously detected as a shape defect portion.

Stated another way, the processing of step S24 is to replace those surface height measurement values, which are included in the inspection-use surface shape information and which correspond to the coordinate information of the mask range, with the interpolated values set based on the surface height measurement values falling outside the mask range. Thus, the processing of step S24 is one example of a mask-range inspection exclusion step of, after correcting the deviation of the coordinate system, excluding those surface height measurement values, which are included in the inspection-use surface shape information and which correspond to the coordinate information of the mask range, from the target of the shape defect inspection process through the above-described interpolated value replacement process.

Further, because of the labeling (S5) being performed on the binary distribution information that has been subjected to the dilation (S4), even when the contours of the indication mark M partly include a portion where rising (change) of the surface height is comparatively gentle, such a portion can be recognized as a portion included within the contours of the indication mark M. As a result, that portion of the contours of the indication mark M can be avoided from being erroneously detected as a shape defect portion.

In the embodiment described above, the mask range is set per line in the Y-axis direction based on the filet coordinates of the label value through the processing of steps S8 to S14 illustrated in FIG. 3.

As another embodiment of the present invention, a rectangular range specified by the filet coordinates for each label value may be set as the mask range instead of the processing of steps S8 to S14 illustrated in FIG. 3. In such a case, the labeling can be performed in the labeling step (S5) without the premise that the coordinates (Y-coordinates) of the opposite ends of the entire circumferential range Wy are adjacent to each other in the Y-axis direction.

Figure 7:
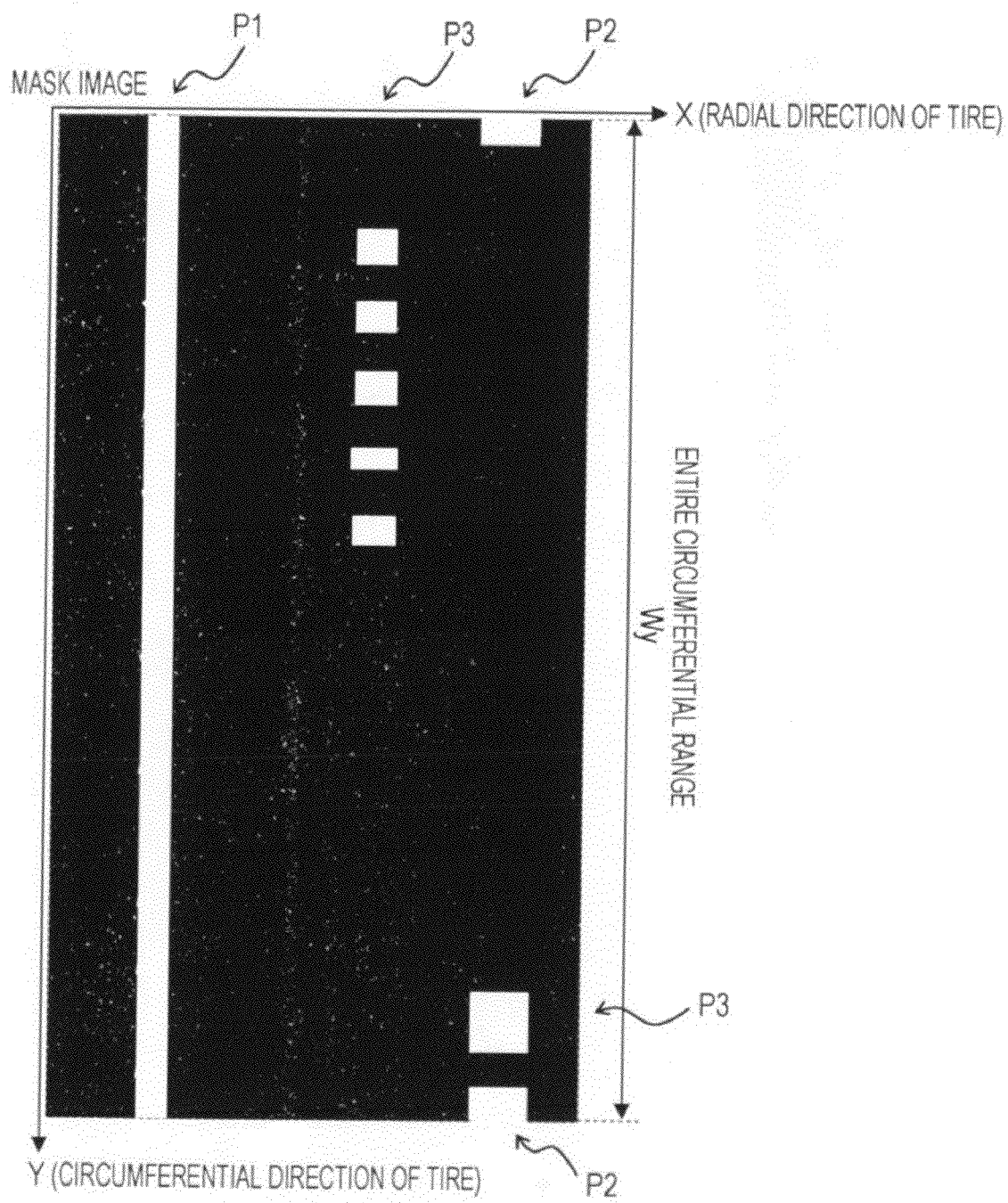
FIG. 7 illustrates, in the form of a binary image, another example of the mask range for the sidewall surface of the tire, which is set during the shape defect inspection.

FIG. 7 illustrates, in the form of a binary image, the mask range when the mask range is given as a rectangular range that is specified by the filet coordinates for each label value based on the corrected binary distribution information, which has been obtained as the image illustrated in FIG. 5.

To more finely set the mask range, however, the processing of steps S8 to S14, illustrated in FIG. 3, is preferably employed.

The tire shape inspection device W is required to execute the processing of steps S2 to S15, which needs a high load of computation, for one sample for each type of the tire 1.

Also, the processing of steps S21 to S25 executed for each tire 1 as the inspection target needs a comparatively low load of computation by the processor and can be executed at a high speed even with a widely used processor.

Further, in the tire shape inspection device W, the automatically-set mask range can be corrected with the very simple manual operation by executing the processing of steps S16 and S17 on the surface shape image g1 of the sidewall surface while visually confirming the mask range. Therefore, the correct mask range can be reliably set for many types of tires having various surface shapes.

Accordingly, when inspecting the shape defect in the sidewall surface of the tire 1 where the embossed indication marks M is formed, the tire shape inspection device W can execute at a high speed the process of reliably finding, from among the surface height measurement values, those measured values falling within the ranges where the indication marks M are formed.

As a result, the correct shape defect inspection can be performed in a short time by using the tire shape inspection device W.

In the embodiment described above, the processing of steps S1 to S17 and the processing of steps S21 to S25 are executed in a sharing manner by the image processing device 6 and the host computer 7, respectively, which are each one example of the processor.

In another embodiment, however, all of steps S1 to S17 and steps S21 to S25 may be executed by the host computer 7, for example. In still another embodiment, the processing of steps S1 to S17 and the processing of steps S21 to S25 may be executed in a sharing manner by three or more processors.

(Second Invention)

First, an overall configuration of a tire shape inspection device W according to one embodiment of the second invention is described with reference to FIG. 14.

The tire shape inspection device W according to the second invention executes a shape measurement process of measuring a surface height distribution of a tire 1 by picking up an image of line light that is emitted for irradiation of a surface of the rotating tire 1, and by executing shape detection with an optical cutting method based on the picked-up image. The shape measurement process provides surface height distribution information that represents a distribution of the surface height measurement values at various positions over a range of 360° in the circumferential direction of the surface of the tire 1. A measurement target of the surface height distribution information is a tread surface or a sidewall surface of the tire 1.

Further, the tire shape inspection device W executes a process of inspecting the shape defect in the surface of the tire 1 based on the surface height distribution information obtained with the shape measurement process, or based on inspection-use surface height distribution information, i.e., information that is obtained by modifying, as required, part of the former surface height distribution information.

Figure 14:
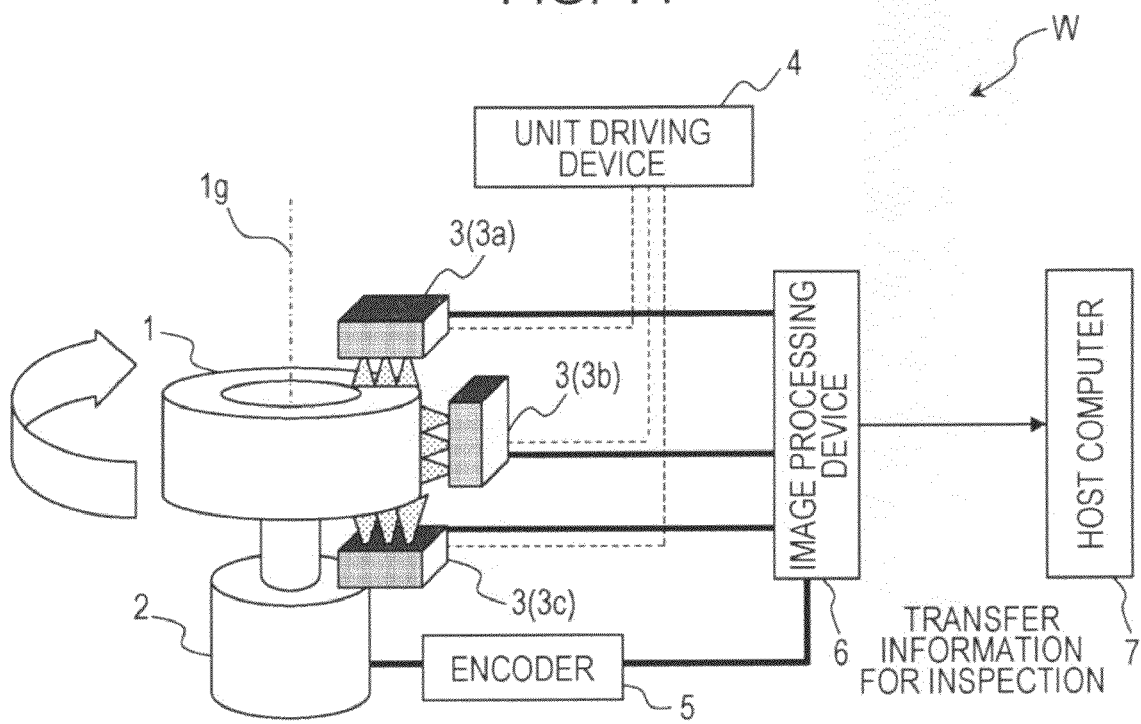
FIG. 14 is a block diagram of a tire shape inspection device W according to one embodiment of the second invention.

As illustrated in FIG. 14, the tire shape inspection device W includes a tire rotating machine 2, sensor units 3, a unit driving device 4, an encoder 5, an image processing device 6, a host computer 7, etc. The tire rotating machine 2 is a rotating device, such as a motor, for rotating the tire 1 about its rotation axis 1g, which is a target of the shape detection.

The tire rotating machine 2 rotates the tire 1 at a rotational speed of 60 rpm, for example. Thus, during one second in which the tire 1 is rotated once, the tire shape inspection device W detects the surface shapes of the tread surface and the sidewall surface of the tire 1 over an entire circumferential range by using the sensor units 3 described later.

The sensor units 3 are each a unit incorporating a light source for irradiating the surface of the rotating tire 1 with a beam of line light, a camera for picking up an image of the line light on the surface of the tire 1, and so on. This embodiment includes a total of three sensor units 3, i.e., two sensor units 3a and 3c for use in the shape measurements of two sidewall surfaces of the tire 1, respectively, and one sensor unit 3b for use in the shape measurement of the tread surface of the tire 1.

Figure 15:
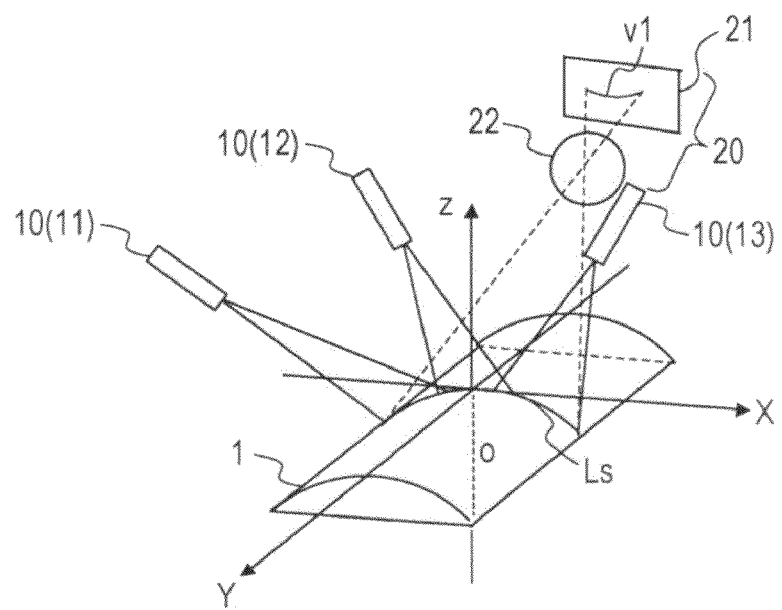
FIG. 15 illustrates a three-dimensional arrangement of light sources and a camera in a sensor unit that is provided in the tire shape inspection device W according to one embodiment of the second invention.

FIG. 15 illustrates an arrangement of components incorporated in each of the sensor units 3.

As illustrated in FIG. 15, the sensor unit 3 includes a light emitting device 10 for outputting plural beams of line light, and a camera 20.

In FIG. 15, an X-axis represents a direction tangential to the circumference of the tire rotation at a position where the shape of the tire 1 is detected, a Z-axis represents a direction of detection height at the position where the shape of the tire 1 is detected (i.e., a direction of surface height to be detected), and a Y-axis represents a direction orthogonal to both the X-axis and the Z-axis.

More specifically, in each of the sensor units 3a and 3c for use in the shape detection of the sidewall surfaces of the tire 1, the Z-axis is a coordinate axis representing the direction of the rotation axis 1g of the tire 1, and the X-axis is a coordinate axis representing the radial direction of the tire 1 (i.e., the direction normal to the direction of the rotation axis 1g of the tire 1).

Also, in the sensor unit 3b for use in the shape detection of the tread surface of the tire 1, the Z-axis is a coordinate axis representing the radial direction of the tire 1, and the X-axis is a coordinate axis representing the direction of the rotation axis 1g of the tire 1.

Further, in each of the sensor units 3a, 3b and 3c, the Y-axis is a coordinate axis representing the circumferential direction of the tire 1. Be it noted that the correspondence relationship between the tire 1 and each coordinate axis may be changed depending on a manner of supporting the camera 20.

The light emitting device 10 includes a plurality (three in FIG. 15) of line light sources 11 to 13. In order that one optical cutting line is formed on one line Ls in the surface of the tire 1 by the plurality of line light sources 11 to 13, the light emitting device 10 emits plural beams of line light from directions differing from the direction of the detection height (i.e., the Z-axis direction) for the one line Ls (i.e., the optical cutting line) so as to continuously lie on the one line (namely, the light emitting device 10 emits the plural beams of line light to be overlapped at respective ends of adjacent beams of line light in a continuous relation such that the one line Ls is irradiated with one beam of line light as a whole).

The camera 20 includes a camera lens 22 and an image pickup element 21 (light receiving unit), and it picks up images v1 of the plural beams of line light impinging in a continuous relation on the surface (i.e., the tread surface or the sidewall surface) of the tire 1 (namely, an image of the optical cutting line on the one line Ls).

Thus, with the sensor units 3a and 3c for the sidewall surfaces, in order that an optical cutting line (one continuous optical cutting line) is formed on one line Ls extending in the radial direction of the tire 1 (i.e., in the Y-axis direction) in the sidewall surface of the tire 1, the light emitting device 10 emits plural beams of line light from directions differing from the direction of the detection height (i.e., the Z-axis direction) for the one line Ls (i.e., the optical cutting line) so as to continuously lie on the one line.

On the other hand, with the sensor unit 3b for the tread surface, in order that an optical cutting line is formed on one line Ls extending in a direction orthogonal to the circumferential direction of the tire in the tread surface of the tire 1, the light emitting device 10 emits plural beams of line light from directions differing from the direction of the detection height (i.e., the Z-axis direction) for the one line Ls (i.e., the optical cutting line) so as to continuously lie on the one line.

While this embodiment illustrates the case of emitting three beams of line light for each surface of the tire 1 (in each sensor unit 3), each surface of the tire 1 may be irradiated with two beams of line light or four or more beams of line light by increasing or decreasing the number of line light sources 11 to 13.

The light emitting device 10 and the camera 20 are held by holding mechanisms (not shown) such that a view field range of the camera 20 exists in a direction in which respective principal rays (i.e., light propagating along a center line) in the plural beams of line light output from each of the line light sources 11 to 13 are regularly reflected by the surface of the tire 1. As a result, the camera 20 picks up respective images of the plural beams of line light in the directions in which the principal rays in the plural beams of line light are regularly reflected by the surface of the tire 1 (one example of the image pickup unit).

When a glossy tire surface is irradiated with line light, the intensity of regularly reflected light is greater than that of light reflected while scattering. With the above-described arrangement, therefore, a clear image of the line light emitted for irradiation of the tire surface can be obtained without enhancing the intensity of the line light even when the image of the line light is picked up at a sufficiently high image-pickup rate (e.g., 4000 or more frames per sec).

On the other hand, the unit driving device 4 (see FIG. 14) is a device for movably supporting each sensor unit 3 by using a driving device, e.g., a servo motor, as a driving source, and for properly positioning each sensor unit 3 with respect to the tire 1. In response to a predetermined operation made on an operating unit or a control command from an external device, the unit driving device 4 positions each sensor unit 3 to a predetermined retracted position spaced from the tire 1 before the tire 1 is attached to the tire rotating machine 2, and to a predetermined inspection position near the tire 1 after the new tire 1 has been attached to the tire rotating machine 2.

Further, the encoder 5 is a sensor for detecting a rotational angle of a rotary shaft of the tire rotating machine 2, i.e., a rotational angle of the tire 1. A signal detected by the encoder 5 is used to control the timing at which the camera in the sensor unit 3 picks up an image.

The image processing device 6 executes shutter control of the camera in the sensor unit 3 (i.e., control of the image-pickup timing) in accordance with the signal detected by the encoder 5. For example, whenever the encoder 5 detects that the tire 1 rotating at the speed of 60 rpm has rotated 0.09° (=360°/4000), the image processing device 6 makes control to release a shutter of the camera. As a result, the image is picked up at the image-pickup rate of 4000 frames per sec.

Further, the image processing device 6 receives the image picked up by the camera in the sensor unit 3, i.e., data of the picked-up image of the line light emitted for irradiation of the surface of the tire 1, executes the shape measurement process using the optical cutting method based on the picked-up image, and stores surface height distribution information (i.e., a set of the surface height measurement values of the tire 1), which is given as the measurement result, in an internal frame memory.

The image processing device 6 is realized with a DSP (Digital Signal Processor), for example. Be it noted that the shape measurement process using the optical cutting method is known in the art, and hence the description thereof is omitted here.

The surface height distribution information regarding the sidewall surface of the tire 1 is such information that the surface height measurement value for each of the positions in the circumferential range of 360° over the sidewall surface is plotted in a two-dimensional coordinate system, which has a first coordinate axis (X-axis in this embodiment) representing the radial direction of the tire 1 and a second coordinate axis (Y-axis in this embodiment) representing the circumferential direction of the tire 1.

Also, the surface height distribution information regarding the tread surface of the tire 1 is such information that the surface height measurement value for each of the positions in the circumferential range of 360° over the tread surface is plotted in a two-dimensional coordinate system, which has an X-axis representing the direction parallel to the rotation axis of the tire 1 and a Y-axis representing the circumferential direction of the tire 1.

Hereinafter, a range occupied by the surface height distribution information in the Y-axis direction (direction of the second coordinate axis), i.e., a Y-axis coordinate range corresponding to 360° in the circumferential direction of the tire 1, is called an "entire circumferential range Wy". The coordinates of opposite ends of the entire circumferential range Wy (i.e., the coordinate of a starting point and the coordinate of an ending point in the Y-axis direction) correspond to positions that are adjacent to each other in the circumferential direction on the actual surface of the tire 1.

Assuming that the surface height measurement value corresponds to a brightness value of each pixel in the image data, the surface height distribution information can be handled in a similar manner to monochromatic image data on the image processing device 6. Accordingly, the term "pixel" appearing in the following description is used as a term representing the position (coordinates) of each of the surface height measurement values in the above-described coordinate system of the X-axis and the Y-axis.

Embossed marks (such as characters, symbols, and figures) are formed in the sidewall surface of the tire 1. Hereinafter, the embossed mark is called an indication mark M (see FIG. 8).

Further, the image processing device 6 executes a surface height distribution information modification process of replacing, for the surface height distribution information regarding the sidewall surface of the tire 1, those surface height measurement values within the range containing the indication mark M therein, which is to be excluded from the target of the shape defect inspection, with interpolated values that change gently. Then, the information regarding the sidewall surface, which has been obtained with the surface height distribution information modification process, and the surface height distribution information regarding the tread surface of the tire 1 are transferred as the inspection-use surface height distribution information to the host computer 7.

The host computer 7 is a computer including a CPU and peripheral devices. The CPU performs various types of computations and outputting of the computation results by executing programs that are previously stored in a memory.

More specifically, the host computer 7 executes the shape defect inspection process based on the inspection-use surface height distribution information regarding each surface of the tire 1, which is obtained from the image processing device 6. The shape defect inspection process is a process of determining whether the inspection-use surface height distribution information regarding each surface of the tire 1 satisfies an allowable condition preset for each surface of the tire 1, and displaying the determination result on a predetermined display portion or outputting it as a predetermined control signal.

Figure 16:
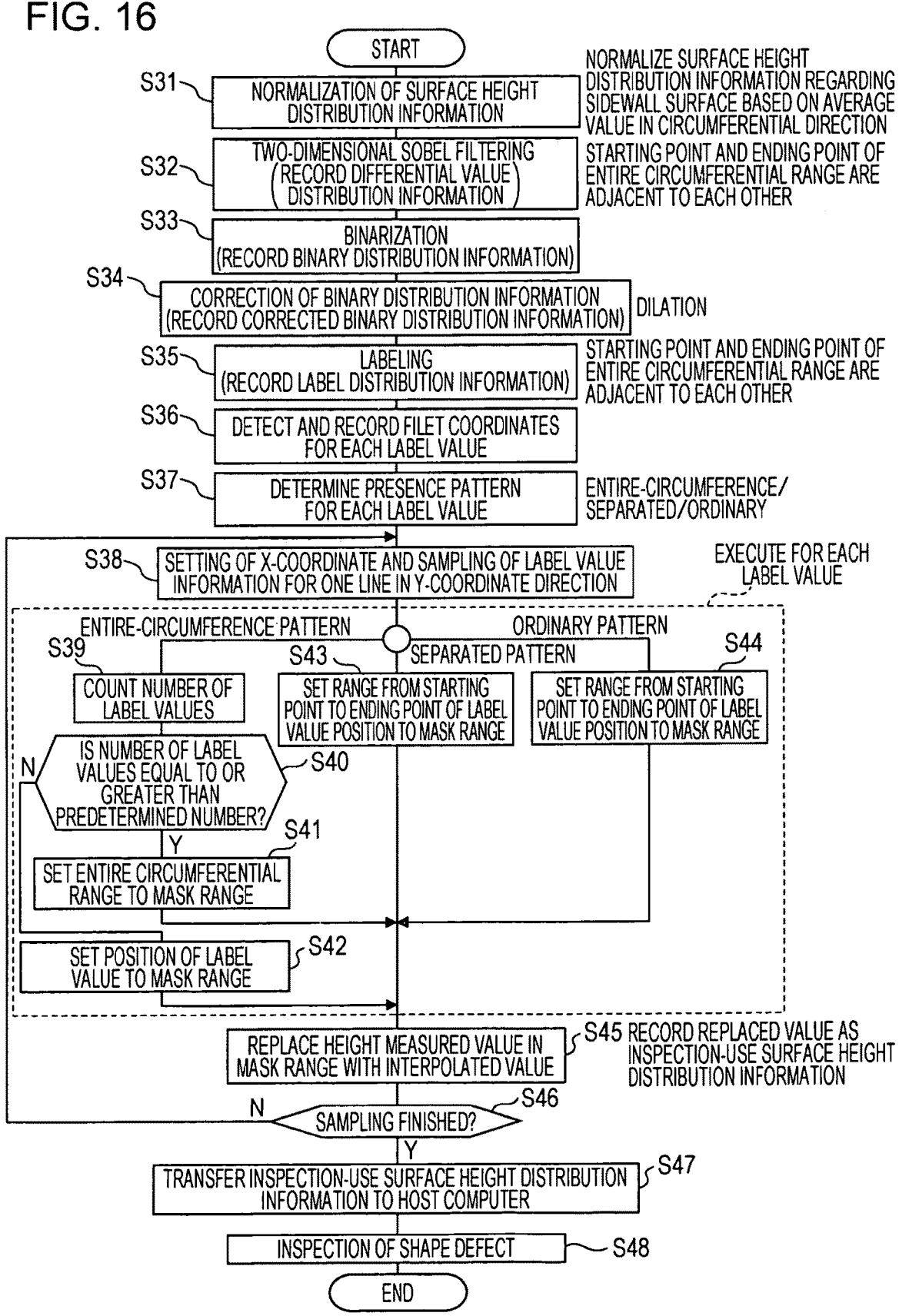
FIG. 16 is a flowchart illustrating one example of procedures of a process for correcting the surface height distribution information regarding the sidewall surface of the tire in one embodiment of the second invention.

One example of procedures of a process for correcting the surface height distribution information regarding the sidewall surface of the tire, which is executed by the image processing device 6, will be described below with reference to a flowchart illustrated in FIG. 16. It is here assumed that, before the process illustrated in FIG. 16 is executed, the shape measurement process has been executed in the manner described above and the surface height distribution information regarding the sidewall surface of a sample of the tire 1 has been stored in the frame memory. S31, S32, etc. in the following description denote symbols for identifying processing procedures (steps).

[Step S31]

First, the image processing device 6 executes a measured value normalization step (S31) for the surface height distribution information regarding the sidewall surface. More specifically, the image processing device 6 normalizes, per line in the Y-direction, the surface height measurement values in the relevant surface height distribution information based on an average value of the surface height measurement values of the one line, and stores the normalized surface height distribution information in the internal frame memory. Each value after the normalization is given, for example, as a value resulting from subtracting the average value from each of the surface height measurement values.

The normalized values obtained with the processing of step S31 represent surface height information after excluding components corresponding to the curved shape in the radial direction (X-axis direction), i.e., to the original shape of the sidewall surface of the tire 1. It is also conceivable, for example, to preset an ideal shape of the sidewall surface in the radial direction on an assumption that the indication marks M are not present, and to set, as the normalized value, a value resulting from subtracting a value of the ideal shape from each of the surface height measurement values.

[Step S32]

Next, the image processing device 6 executes a filtering step (S32) of performing two-dimensional Sobel filtering on the surface height distribution information including the surface height measurement values that have been normalized in the measured value normalization step (S31), and storing gradient value distribution information, given as the filtering result, in the internal frame memory.

The Sobel filtering is a process of totalizing the results of multiplying respective values (normalized surface height measurement values) for a group of pixels in a predetermined number, which includes a certain target pixel and surrounding pixels, by coefficients preset depending on the positions of the pixels. Further, in the two-dimensional Sobel filtering, the multiplications of the coefficient and the totalizing of the multiplication results are performed by using two coefficient matrices that correspond respectively to the X-axis direction and the Y-axis direction, and the root of the square sum of both the totals is calculated as the processing result. Consequently, the processing result is obtained as a higher value as the surface height of the sidewall surface has a larger gradient. Hereinafter, the processing result for each pixel obtained with the two-dimensional Sobel filtering is called a "gradient value", and a set of respective gradient values of the pixels in the X-Y coordinate system is called "gradient value distribution information". Be it noted that the two-dimensional Sobel filtering is known in the art, and hence the detailed description thereof is omitted here.

Further, in the filtering step (S32), the Sobel filtering is executed on the premise that the coordinates (Y-coordinates) of the opposite ends of the entire circumferential range Wy are adjacent to each other in the Y-axis direction, thus enabling the gradient value to be obtained for each of pixels near the opposite ends of the entire circumferential range Wy.

In the two-dimensional Sobel filtering for the tire shape inspection, the gradient value of the target pixel is calculated based on values of a group of 9 pixels including the target pixel and surrounding 8 pixels, or values of a group of 25 pixels including the group of 9 pixels and surrounding 16 pixels.

[Step S33]

Then, the image processing device 6 executes a binarization step (S33) of binarizing the gradient value distribution information and storing the binary distribution information, given as the processing result, in the frame memory. With the binarization step, an ON value (e.g., 1) is set to a pixel of which value (gradient value) is equal to or greater than a preset threshold, and an OFF value (e.g., 0) is set to other pixels.

With the above-described processing of steps S31 to S33, even when the edges (contours) of the indication mark M are formed to extend in any direction in the two-dimensional coordinates, those edges can be detected reliably. Thus, steps S32 and S33 represent one example of a two-dimensional edge detection step of detecting the edges of the embossed indication mark M by executing a two-dimensional edge detection process (i.e., the two-dimensional Sobel filtering and the binarization) on the surface height distribution information, and storing the detection result (two-dimensional edge distribution information) in the frame memory.

FIG. 4 illustrates, in the form of an image, one example of the binary distribution information regarding the sidewall surface, which is obtained with the processing of step S33. In FIG. 4, a black region represents a region where the pixel in the binary distribution information has the OFF value (=0), and a white region represents a region where the pixel in the binary distribution information has the ON value (=1). In other words, the white region in FIG. 4 represents the edge of the indication mark M.

[Step S34]

Next, the image processing device 6 executes a binary distribution information correction step (S34) of performing a predetermined correction process on the binary distribution information, and storing information after the correction (i.e., corrected binary distribution information) in the frame memory.

More specifically, in step S34, the image processing device 6 executes the so-called dilation on the binary distribution information. The dilation is a process of, when at least one ON value (=1) exists near a certain target pixel (e.g., among 4 or 8 pixels surrounding the target pixel) in the binary distribution information that can be regarded as binary image information, the value of the relevant target pixel is corrected to the ON value (=1).

As a result of the dilation, even when the contour of the indication mark M includes a portion where rising (change) of the surface height is comparatively gentle, such a portion is recognized as a part of the contour of the indication mark M.

FIG. 5 illustrates, in the form of an image, the corrected binary distribution information after the dilation executed on the binary image information that has been obtained as an image illustrated in FIG. 4. In FIG. 5, a black region represents a region where the pixel in the corrected binary distribution information has the OFF value (=0), and a white region represents a region where the pixel in the corrected binary distribution information has the ON value (=1). In other words, the white region in FIG. 5 represents the edge of the indication mark M.

The known process of excluding an isolated point may be performed prior to the dilation, as part of the above-described correction process, so that noises caused by small extraneous matters, small projections, etc. on the sidewall surface, will not be increased.

[Step S35]

Next, the image processing device 6 executes a labeling step (S35) of performing labeling on the corrected binary distribution information that has been obtained with the processing of step S34, and storing label distribution information, given as the labeling result, in the frame memory.

The labeling is the known process of assigning the same label for each of connected pixels, and the label distribution information is information resulting from setting the label value to a value of each pixel that has the ON value (=1) in the corrected binary distribution information.

In this step S35, as in the above-described step S32, the labeling is executed on the premise that the coordinates (Y-coordinates) of the opposite ends of the entire circumferential range Wy are adjacent to each other in the Y-axis direction. As a result, even when connected pixels corresponding to the edge of the indication mark M are separated (disconnected) to the starting end side and the terminating end side of the entire circumferential range Wy due to the starting position of the shape measurement process, the same label value is set to those pixels.

As an alternative, the labeling may be executed in step S35 on the binary distribution information before the correction, which has been obtained with the processing of step S33, by omitting the binary distribution information correction step in step S34.

[Step S36]

Next, the image processing device 6 executes a filet coordinate detection step (S36) of detecting, for each label value in the label distribution information obtained with the processing of step S35, filet coordinates of the relevant label value, and storing the filet coordinates in the predetermined internal memory. The filet coordinates are, as known in the art, coordinates representing a rectangular range surrounding a group of pixels (connected pixels) having the same label value with a minimum area.

[Steps S37 to S44]

Next, the image processing device 6 executes a mask range setting step (S37 to S44) of setting, based on the filet coordinates of the label value which have been obtained in step S36, coordinates of a mask range including the range where the indication mark M exists, and storing the set coordinates in the internal memory. The term "mask range" means a range surrounding, for each group of pixels to which the same label value is set in the label distribution information, the relevant group of pixels.

Details of the mask range setting step will be described below.

[Step S37]

First, the image processing device 6 executes a label presence pattern determination step (S37) of determining, for each label value in the label distribution information, that a pattern of the label-value presence range in the Y-direction (circumferential direction) is which one of preset three types of presence patterns, based on the filet coordinates of the relevant label value (i.e., of the connected pixels), and storing the determination result in the internal memory.

The three types of presence patterns are the following three patterns P1 to P3. Images corresponding to those patterns P1 to P3 are illustrated in FIG. 6.

The first one is an entire-circumference pattern P1 (corresponding to the first presence pattern) in which the label value exists continuously over the entire circumferential range Wy.

The second one is a separated pattern P2 (corresponding to the second presence pattern) in which the label value exists separately in a region including the starting end (one end) of the entire circumferential range Wy and a region including the terminating end (the other end) thereof.

The third one is an ordinary pattern P3 (corresponding to the third presence pattern) in which the label value is in the other state than those of the entire-circumference pattern and the separated pattern.

For example, the image processing device 6 determines, for a certain target label value, whether the starting end and the terminating end in the Y-axis direction of the range represented by the filet coordinates coincide respectively with the starting end and the terminating end of the entire circumferential range Wy. If the coincidence is determined, the image processing device 6 determines whether the target label value exists in both ranges defined by dividing the entire circumferential range Wy into two equal parts. If the determination result shows that the target label value exists in both the ranges, the image processing device 6 determines that the target label value is in the entire-circumference pattern. If not so, the image processing device 6 determines that the target label value is in the separated pattern.

Further, if the starting end and the terminating end in the Y-axis direction of the range represented by the filet coordinates of the target label value do not coincide respectively with the starting end and the terminating end of the entire circumferential range Wy, the image processing device 6 determines that the target label value is in the ordinary pattern.

[Step S38]

Next, the image processing device 6 sets (selects) the X-axis coordinate one by one and samples (selects), from among the label distribution information stored in the frame memory, information of the label values of one line in the Y-axis direction at the set X-axis coordinate, as information for use in a process of setting the mask range (S38). After this step, the image processing device 6 executes the following processing of steps S39 to S44 whenever the information of the label values of one line in the Y-axis direction is sampled.

The X-axis coordinates set for the above-described sampling may be all of the coordinates (pixels) in the range occupied by the surface height distribution information in the X-axis direction or part of the coordinates (pixels) extracted at predetermined intervals depending on the spatial resolution that is required for the shape defect inspection. So long as the set X-axis coordinates are in the range of the spatial resolution allowable for the shape defect inspection, the X-axis coordinates are preferably set at larger intervals from the viewpoint of reducing the computation load.

Next, the image processing device 6 executes a per-line mask range setting step (S39 to S42, S43 or S44) of setting, per line in the Y-axis direction which has been sampled in step S38, coordinates of the mask range on the relevant one line in the Y-axis direction based on the respective determination results of the presence pattern of the label values existing on the relevant one line and the positions of the label values, and storing the set coordinates in the internal memory.

A practical example of the per-line mask range setting step will be described below.

[Steps S39 to S42]

First, if the presence pattern (determination result) of the target label value is the entire-circumference pattern P1 (first presence pattern), the image processing device 6 counts the number of the target label values (S39) and determines whether the count number is equal to or greater than a preset number (setting number) (S40).

If it is determined that the count number of the target label values is equal to or greater than the setting number, the image processing device 6 sets the entire one line in the Y-axis direction (i.e., the entire circumferential range Wy), which is sampled at that time, to the mask range (S41).

On the other hand, if it is determined that the count number of the target label values is less than the setting number, the image processing device 6 sets only the positions where the target label values exist on the one line in the Y-axis direction, which is sampled at that time, to the mask range (S12).

[Step S43]

Meanwhile, if the presence pattern (determination result) of the target label value is the separated pattern P2 (second presence pattern), the image processing device 6 sets, to the mask range, a range from each of the opposite ends of the entire circumferential range Wy to the position of the target label value farthest away from the corresponding one of the opposite ends (i.e., from the starting end position or the terminating end position) of the entire circumferential range Wy in each of two halved ranges of the entire circumferential range Wy (S43).

More specifically, in the range from the starting end position to the mid position of the entire circumferential range Wy, a range starting from the relevant starting end position and ending at the position of the target label value nearest to the mid position is set to the mask range. Further, in the range from the mid position to the terminating end position of the entire circumferential range Wy, a range starting from the position of the target label value nearest to the mid position and ending at the relevant terminating end position is set to the mask range.

[Step S44]

Further, if the presence pattern (determination result) of the target label value is the ordinary pattern P3, the image processing device 6 sets, to the mask range, a range covering all the positions where the target label values exist (S44).

More specifically, a range starting from the position of the target label value nearest to the starting end position of the entire circumferential range Wy and ending at the position of the target label value nearest to the terminating end position of the entire circumferential range Wy is set to the mask range.

The above-described processing of steps S39 to S44 is executed for each same label value on the sampled one line in the Y-axis direction, and a range resulting from taking logical OR of the mask ranges set for each label value is set to a final mask range in the relevant one line.

[Step S45]

Then, whenever the final mask range is set for the sampled one line in the Y-axis direction, the image processing device 6 executes a mask range interpolation step (S45) as follows.

In the mask range interpolation step, the image processing device 6 first calculates, with respect to the line in the Y-axis direction for which the mask range has been set, interpolated values for those surface height measurement values, which fall within the mask range, based on those surface height measurement values, which are included in the surface height distribution information and which fall outside the mask range. The interpolated values are gently-changing values and are typically interpolated by using a straight line, but they may be interpolated by using a curve of secondary degree as another example.

Further, the image processing device 6 replaces, with respect to the line in the Y-axis direction for which the mask range has been set, those surface height measurement values, which are included in the surface height distribution information stored in the frame memory and which fall within the mask range, with the interpolated values for the relevant surface height measurement values, and stores the replaced values in the frame memory. Thus, the surface height distribution information after replacing those surface height measurement values falling within the mask range as described above is the inspection-use surface height distribution information that is used in the shape defect inspection process executed by the host computer 7.

[Step S46 and S47]

Thereafter, the image processing device 6 makes control such that the above-described processing of steps S38 to S45 is repeated until the sampling (S38) in a predetermined number is finished (S46). As a result, the inspection-use surface height distribution information regarding the sidewall surface of the tire 1 is obtained.

Then, the image processing device 6 transfers the inspection-use surface height distribution information regarding the sidewall surface of the tire 1 to the host computer 7, which executes the shape defect inspection process by using the transferred information (S47).

When only partial coordinates (lines) in the range occupied by the surface height distribution information in the X-axis direction have been sampled in step S38, the other information than that corresponding to the sampled positions (lines) is not included in the inspection-use surface height distribution information.

Then, the host computer 7 executes the shape defect inspection process (S48) for the sidewall surface of the tire 1 in accordance with the predetermined rules by using the inspection-use surface shape information (i.e., the surface height distribution information after replacing those the surface height measures values falling within the mask range with the interpolated values). One example of the shape defect inspection process will be described below. Be it noted that the following example does not represent the feature of the present invention.

First, the host computer 7 samples (selects), from among the inspection-use surface height distribution information, the information of the measured values (which may partly include the interpolated values) of one line in the Y-axis direction to be a target of the shape defect inspection.

Next, the host computer 7 calculates a first index value, which is described below by way of example, as an index value for a local concave/convex defect (i.e., the bulges and the dent).

Low-pass filtering is first performed on the measured values of one line in the Y-axis direction through FFT with a preset number of orders (e.g., 50 orders) or less.

Then, an angular range of about 7° is set as a window, and the window is scanned over an angular range of 360°, which corresponds to all of the measured values after the low-pass filtering, to calculate a difference between a maximum value and a minimum value among the measured values in each window range. The calculated difference is set to the first index value. When the first index value exceeds a predetermined value, it is determined that the relevant tire has the shape defect.

Further, the host computer 7 calculates a second index value, which is described below by way of example, as an index value for defect inspection (also called "Runout inspection") with respect to gentle concave/convex change over the entire circumference of the tire.

Low-pass filtering is first performed on the measured values of one line in the Y-axis direction through FFT with a preset number of orders (e.g., 15 orders) or less.

Then, a difference between a maximum value and a minimum value among all the measured values after the low-pass filtering is calculated and set to the second index value. When the second index value exceeds a predetermined value, it is determined that the relevant tire has the shape defect.

FIG. 6 illustrates, in the form of a binary image, one example of the mask range set based on the corrected binary distribution information, which has been obtained as the image illustrated in FIG. 5, through the processing of steps S38 to S46. In FIG. 6, a white region indicates the mask range.

In the tire shape inspection device W described above, the normalized surface height distribution information in the form of two-dimensional information is subjected to the known Sobel filtering while it remains as two-dimensional information (S32). Accordingly, even when the edges (contours) of the indication mark M are formed to extend in any direction in the two-dimensional coordinates, the edges can be detected reliably.

Further, with the labeling (S5), the same label value is set for each of edges of one design of indication mark M isolated from the others. The mask range to be excluded from the target of the shape defect inspection is set based on the filet coordinates (for each same label value) of those edges (S36 to S44). Accordingly, the measured value of the not-raised portion located within the contours of the indication mark M is also excluded from the target of the shape defect inspection, and the relevant not-raised portion can be avoided from being erroneously detected as a shape defect portion. As seen from one example illustrated in FIG. 6, portions within the contours of the indication marks M, such as characters "A", "B" and "W", are each set to be included in the mask range.

Moreover, in the tire shape inspection device W, the measured values within the mask range are replaced with the interpolated values that change gently (S45). Therefore, even when the shape defect inspection process is executed in the same algorithm regardless of the presence or the absence of the mask range, the shape within the mask range can be avoided from being erroneously detected as a shape defect portion.

Further, because of the labeling (S35) being performed on the binary distribution information that has been subjected to the dilation (S34), even when the contours of the indication mark M partly include a portion where rising (change) of the surface height is comparatively gentle, such a portion can be recognized as a portion included within the contours of the indication mark M. As a result, that portion of the contours of the indication mark M can be avoided from being erroneously detected as a shape defect portion.

In the embodiment described above, the mask range is set per line in the Y-axis direction based on the filet coordinates for the label value through the processing of steps S38 to S44 illustrated in FIG. 16.

As another embodiment of the present invention, a rectangular range specified by the filet coordinates for each label value may be set as the mask range instead of the processing of steps S38 to S44 illustrated in FIG. 16. In such a case, the labeling can be performed in the labeling step (S35) without the premise that the coordinates (Y-coordinates) of the opposite ends of the entire circumferential range Wy are adjacent to each other in the Y-axis direction.

FIG. 7 illustrates, in the form of a binary image, the mask range when the mask range is given as a rectangular range that is specified by the filet coordinates for each label value based on the corrected binary distribution information, which has been obtained as the image illustrated in FIG. 5.

To more finely set the mask range, however, the processing of steps S38 to S44, illustrated in FIG. 16, is preferably employed.

Secondary problems caused in the above-described embodiments will be described below.

In some cases, many recesses that are so small as not to become the target of the shape defect inspection are formed in the sidewall surface of the tire 1. When an image of the sidewall surface of the tire 1 is picked up by the camera 20 in the direction in which the principal ray of the line light is regularly reflected, the light reflected by the small recesses does not reach the camera 20. This raises a problem that a clear, i.e., highly-bright image of the optical cutting line cannot be obtained for the positions corresponding to areas of the small recesses in the image picked up by the camera 20. Hereinafter, such a problem is called a "problem attributable to the small recess".

In some of the tires 1, a belt-like projected or recessed mark is formed in the sidewall surface of the tire almost thoroughly in the circumferential direction. Hereinafter, such a mark is called an "annular mark". In some others of the tires 1, many projected or recessed marks are formed in the sidewall surface of the tire so as to lie on a line almost thoroughly in the circumferential direction. Hereinafter, a set of those plural marks is called a "group of quasi-annular marks".

Figure 17:
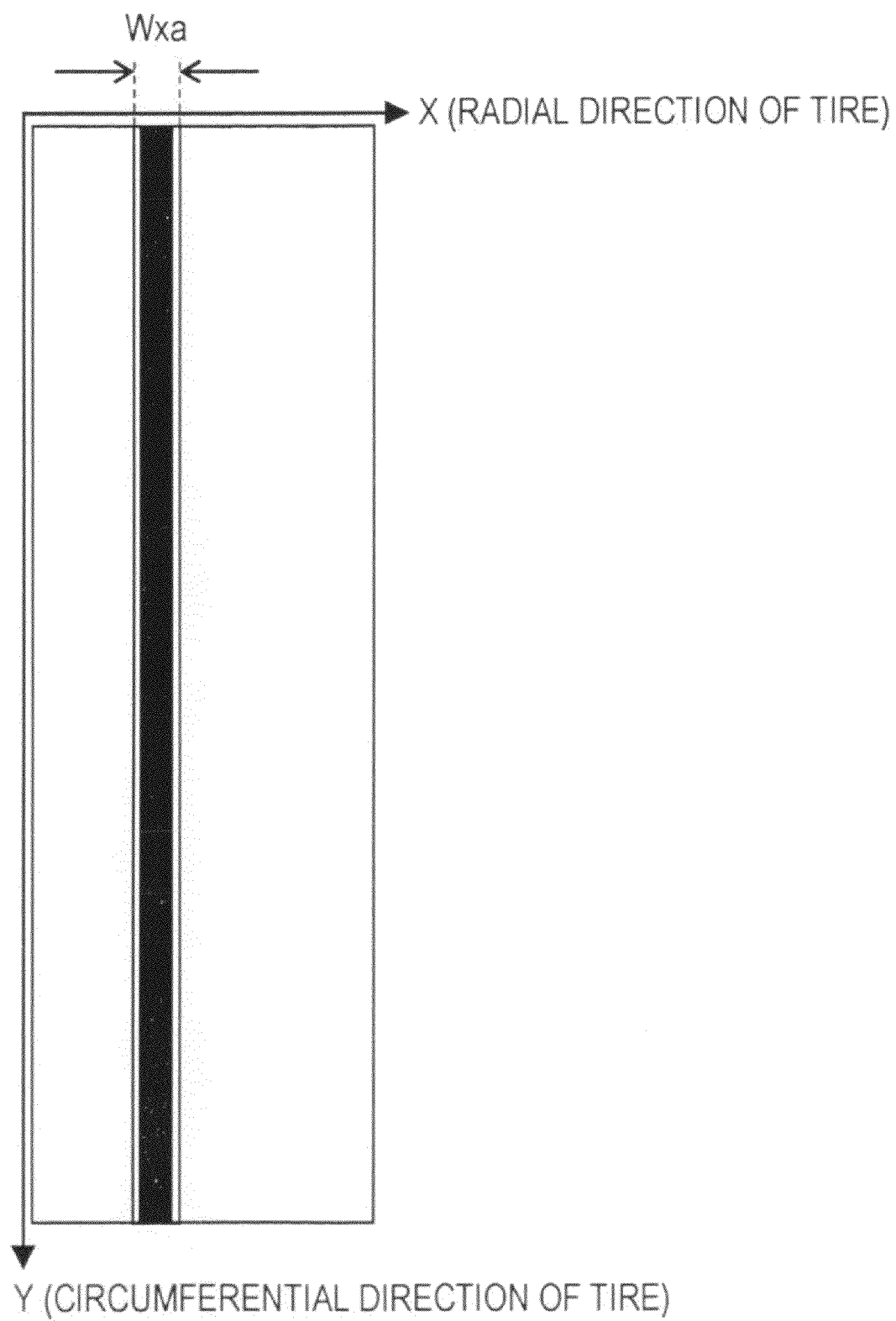
FIG. 17 illustrates, in terms of an X-Y coordinate system, the sidewall surface of the tire in which an annular mark is formed.
Figure 18:
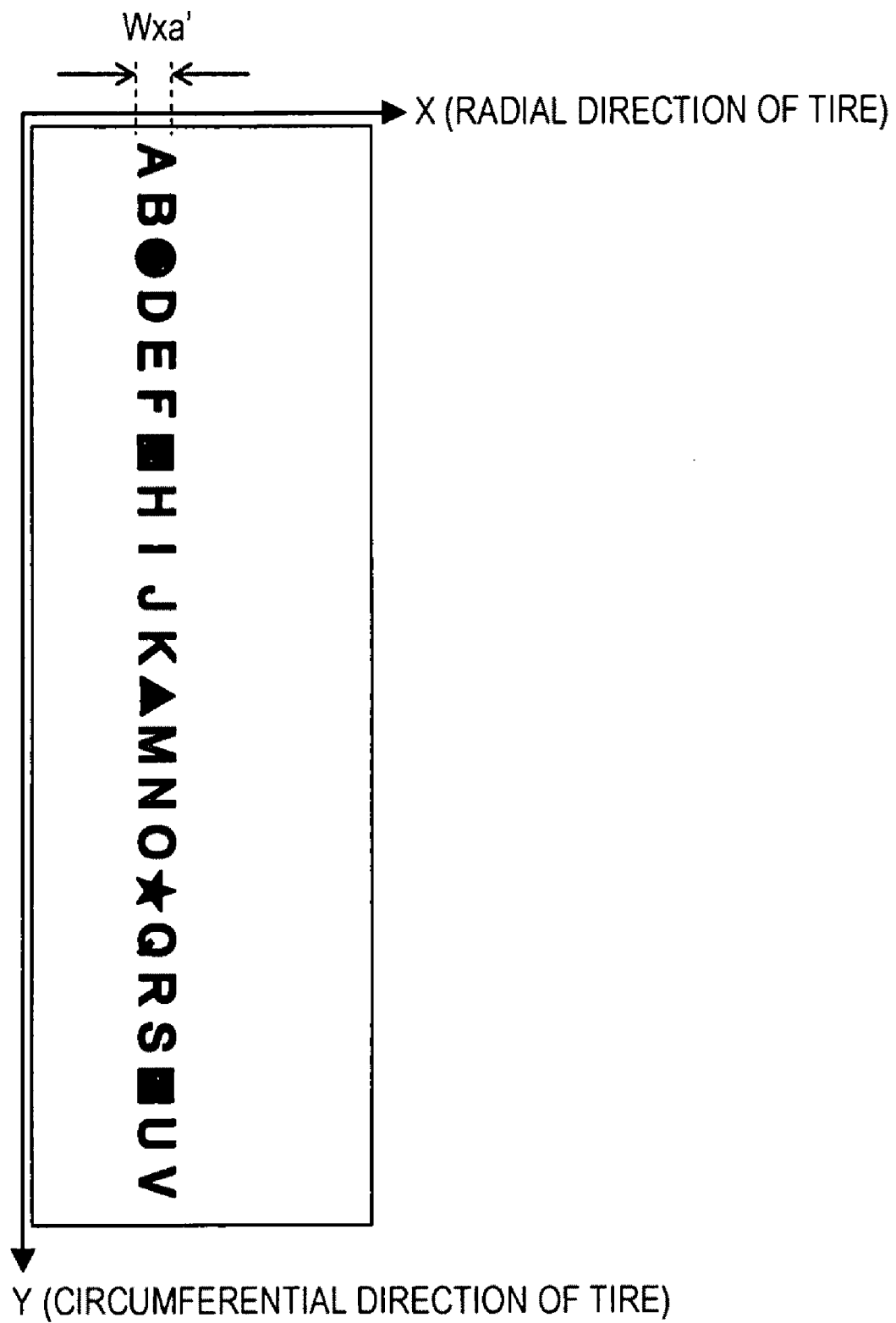
FIG. 18 illustrates, in terms of an X-Y coordinate system, the sidewall surface of the tire in which a group of quasi-annular marks is formed.

FIG. 17 illustrates, in terms of an X-Y coordinate system, the sidewall surface of the tire in which the annular mark is formed. FIG. 18 illustrates, in terms of an X-Y coordinate system, the sidewall surface of the tire in which the group of quasi-annular marks is formed.

In FIGS. 17 and 18, a region filled with black represents a region of the projected or recessed mask.

FIGS. 17 and 18 illustrate examples in which the annular mark and the group of quasi-annular marks exist parallel to the Y-axis direction. In the image picked up by the camera 20, however, the annular mark and the group of quasi-annular marks appear with a slight deviation relative to a direction parallel to the Y-axis direction. The causes may be, e.g., an error in the mark-formed position with respect to the tire, a shift of the rotation axis of the tire, and a shift of the direction in which the image is picked up by the camera 20.

When the annular mark illustrated in FIG. 17 is formed in the sidewall surface of the tire 1 and a boundary line of a region Wxa, in which the annular mark is formed, is deviated relative to the Y-axis direction, the following problem occurs even in the above-described embodiments.

For convenience of explanation, the surface height measurement values of the tire 1 before the normalization, which is obtained with the shape measurement process using the optical cutting method, is called "pre-normalization height measured values". Also, the height measured values normalized based on the average value of the pre-normalization height measured values of one line in the circumferential direction (Y-axis direction) of the tire 1 is called "post-normalization height measured values".

When the direction of the boundary line of the region Wxa, in which the annular mark is formed, is deviated relative to the Y-axis direction, a projected or recessed portion and the other portion being neither projected nor recessed exist on one line in the circumferential direction (Y-axis direction) of the tire in a mixed manner near the position of the boundary line of the annular mark in the radial direction of the tire 1, i.e., in the X-axis direction. In such a situation, there occurs a phenomenon that the post-normalization height measured values represent an incorrect shape differing from the actual shape of the sidewall surface of the tire 1. This results in erroneous detection of the shape defect. Hereinafter, such a problem is called a "problem attributable to the annular mark". The problem attributable to the annular mark similarly arises when the group of quasi-annular marks is formed in the sidewall surface of the tire and the direction of a boundary line of a region Wxa', in which the group of quasi-annular marks is formed, is deviated relative to the Y-axis direction.

Another example of procedures of the process for correcting the surface height distribution information regarding the sidewall surface of the tire, which is executed by the image processing device 6, will be described below with reference to a flowchart illustrated in FIG. 19.

Figure 19:
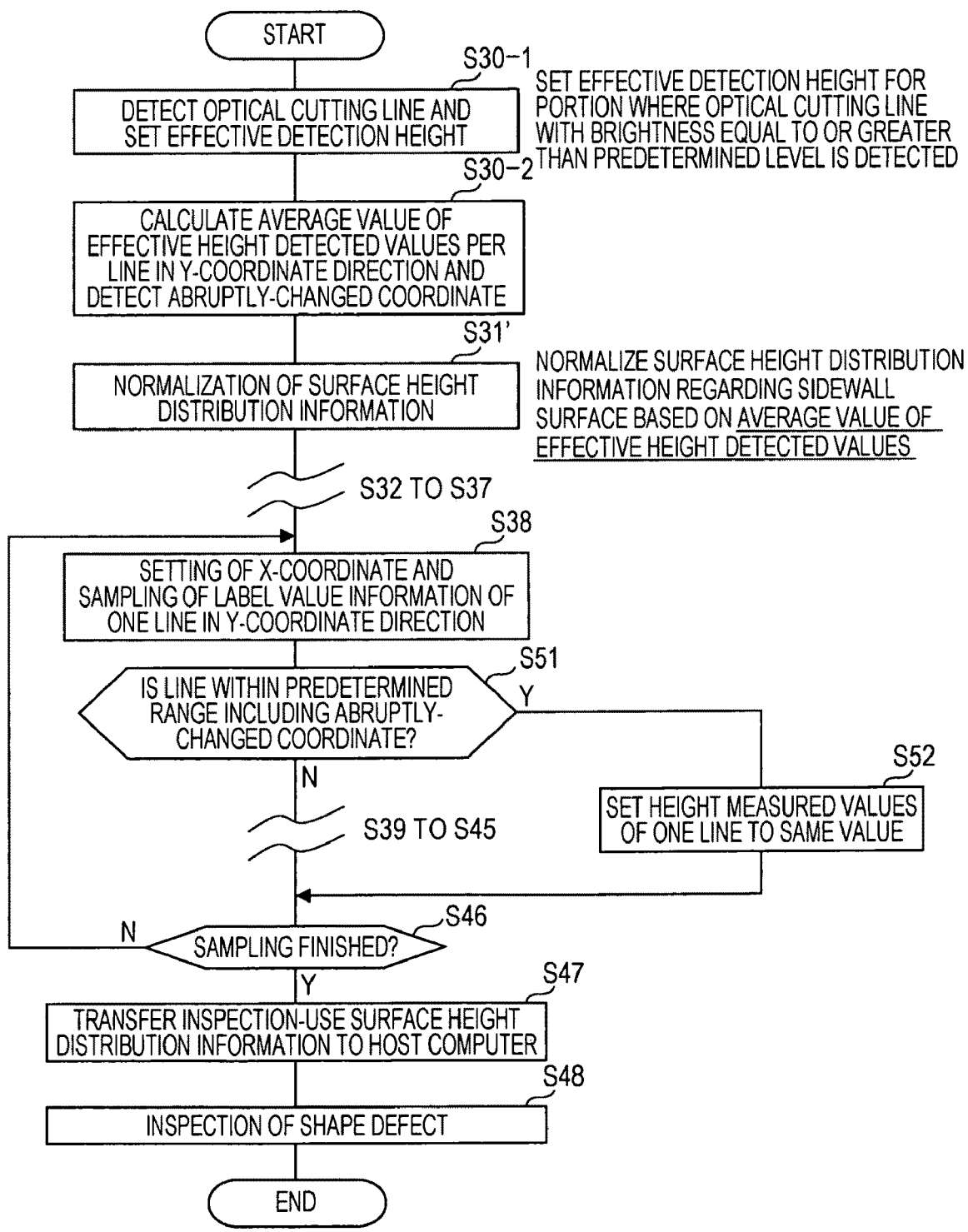
FIG. 19 is a flowchart illustrating another example of procedures of the process for correcting the surface height distribution information regarding the sidewall surface of the tire in one embodiment of the second invention.

The process illustrated in FIG. 19 is an application example of the process illustrated in FIG. 16. In other words, the process illustrated in FIG. 19 is partly modified from the process illustrated in FIG. 3 in order to solve the problem attributable to the small recess and the problem attributable to the annular mark.

The process illustrated in FIG. 19 will be described below only about part modified from the process illustrated in FIG. 16. Be it noted that, in the flowchart of FIG. 19, part of the same procedures as those in the process illustrated in FIG. 16 is omitted. Further, in FIG. 19, the same procedures as those in the process illustrated in FIG. 16 are denoted by the same identification symbols.

In the process illustrated in FIG. 19, a shape measurement process using the above-described optical cutting method (i.e., an optical-cutting-method shape detection step) is executed in step S30-1 before a process (S31') of normalizing the surface height distribution information is executed.

More specifically, in step S30-1, the image processing device 6 detects, from the image picked up by the camera 20, the optical cutting line having brightness equal to or greater than a preset threshold. Further, the image processing device 6 obtains, from the position of the detected optical cutting line, the pre-normalization height measured values plotted in the two-dimensional coordinate system, which has the X-axis direction representing the radial direction of the tire 1 and the Y-axis direction representing the circumferential direction of the tire 1, and stores the surface height distribution information including the obtained pre-normalization height measured values in the frame memory within the image processing device 6.

As a result, the surface height distribution information before the normalization, regarding the sidewall surface of the tire 1, is stored in the frame memory within the image processing device 6.

As mentioned above, however, when the small recesses exist in the sidewall surface of the tire 1, the optical cutting line having brightness equal to or greater than the preset threshold cannot be detected in the shape measurement process (S30-1) using the optical cutting method for the positions (coordinates) that correspond to the small recesses in the image picked up by the camera 20, and hence the pre-normalization height measured values cannot be obtained.

For convenience of explanation, with respect to a portion in which the optical cutting line having brightness equal to or greater than the preset threshold has been detected in the shape measurement process (S30-1) using the optical cutting method, the pre-normalization height measured value obtained corresponding to the position of the detected optical cutting line is called an "effective height detected value". Further, with respect to a portion in which the optical cutting line having brightness equal to or greater than the preset threshold has not been detected in the shape measurement process (S30-1) using the optical cutting method, predetermined information indicating that the optical cutting line has not been detected in the relevant portion, e.g., information such as "0" or "NULL", is set to a location in the surface height distribution information, which corresponds to the relevant portion.

After the shape measurement process (S30-1, the optical-cutting-method shape detection step) using the optical cutting method, the image processing device 6 calculates (S30-2), per line in the Y-axis direction, an average value Have of the effective height detected values of the one line from the surface height distribution information before the normalization, for which the effective height detected values have been set. As a result, a data train in the X-axis direction, which includes data of the average value Have of the effective height detected values per line in the Y-axis direction. Hereinafter, such a data train is called an "effective-height average value data train".

Further, the image processing device 6 executes differentiation on the effective-height average value data train and detects, for the effective-height average value data train, an average height abruptly-changed coordinate xb, i.e., an X-axis coordinate at which an absolute value of the differential value is equal to or greater than a preset threshold (S30-2, average height abruptly-changed coordinate detection step).

Figure 20:
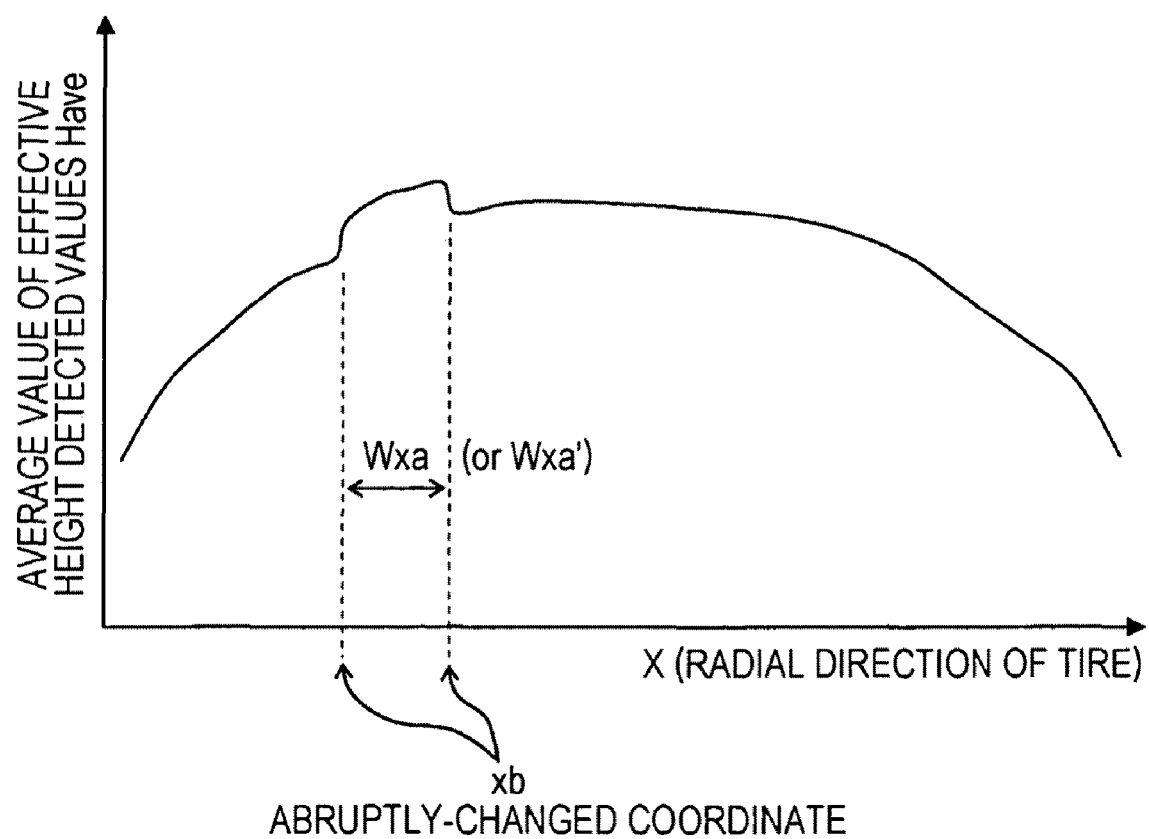
FIG. 20 illustrates, in the form of a graph, one example of a data train of average values each obtained for the effective height detected values in the surface height distribution information before normalization in one embodiment of the second invention.

FIG. 20 illustrates one example of the effective-height average value data train in the form of a graph in which the horizontal axis represents the X-axis corresponding to the radial direction of the tire 1 and the vertical axis represents the average value Have of the effective height detected values.

When the annular mark exists in the sidewall surface of the tire 1, the effective-height average value data train is obtained, as illustrated in FIG. 20, such that the average value Have of the effective height detected values is abruptly changed at each boundary position of the range corresponding to the region Wxa in which the annular mark is formed. This is similarly applied to the case where the group of quasi-annular marks exists in the sidewall surface of the tire 1.

The example illustrated in FIG. 20 represents the case where the projected annular mark is formed in the sidewall surface of the tire 1.

Further, as illustrated in FIG. 20, the average height abruptly-changed coordinate xb detected in step S30-2 represents each boundary position of the range corresponding to the region Wxa or Wxa' in the sidewall surface of the tire 1 where the annular mark or the quasi-annular marks are formed.

Then, the image processing device 6 executes the measured value normalization step (S31'), as described below, for the surface height distribution information regarding the sidewall surface of the tire 1. This step S31' corresponds to the measured value normalization step (S31) in the example illustrated in FIG. 16.

More specifically, the image processing device 6 sets the surface height measurement values per line in the Y-axis direction, which are included in the surface height distribution information, in accordance with the following two rules.

The first rule is to set, for a portion in the relevant one line where the optical cutting line having brightness equal to or greater than the preset threshold has been detected, the effective height detected value in the relevant portion to a value normalized based on the average value Have of the effective height detected values of the relevant one line.

The second rule is to set, for the other portion in the relevant one line, the value interpolated based on the effective height detected values of the relevant one line to the value normalized based on the average value Have of the effective height detected values of the relevant one line.

In each of the first rule and the second rule, the value normalized based on the average value Have of the effective height detected values is given as, e.g., a value obtained by dividing the value as a target of the normalization by the average value Have of the effective height detected values, or a value obtained by subtracting the average value Have of the effective height detected values from the value as a target of the normalization.

Also, in the second rule, the other portion in the relevant one line means the portion where the optical cutting line having brightness equal to or greater than the preset threshold has not been detected.

Further, the interpolated value in the second rule may be, e.g., the average value Have of the effective height detected values of one line in the Y-axis direction. As an alternative, the interpolated value in the second rule may be a value interpolated, using a straight line, based on the effective height detected values of one line in the Y-axis direction.

After executing the processing of steps S30-1, S30-2 and S31', the image processing device 6 executes the processing of steps S33 to S37 illustrated in FIG. 16. Thus, in the steps S32 and S33 which represent one example of the above-described two-dimensional edge detection step, the image processing device 6 executes the above-described two-dimensional edge detection process on the surface height distribution information including the surface height measurement values that have been normalized in the measured value normalization step of step S31'.

Further, after executing the processing of steps S33 to S47 illustrated in FIG. 16, the image processing device 6 executes loop processing of steps S38 to S46 illustrated in FIG. 16 and the processing of step S47 illustrated in FIG. 16.

Then, the host computer 7 executes the shape defect inspection process (S48) regarding the sidewall surface of the tire 1 by using the inspection-use surface height distribution information.

In the example illustrated in FIG. 19, however, the image processing device 6 executes a process of excluding, from the target of the shape defect inspection process, a region spanning entirely in the Y-axis direction within a coordinate range having a predetermined width and containing the average height abruptly-changed coordinate xb on the X-axis, which are included in the surface height distribution information (S41 and S42, defect-inspection exclusion region setting step).

While there are various practical examples of the defect-inspection exclusion region setting step, one of those examples is described below.

The defect-inspection exclusion region setting step (S41 and S42) illustrated in FIG. 19 is executed during the loop processing of steps S38 to S46 illustrated in FIG. 16.

More specifically, whenever the sampling of the label value information of one line in the Y-axis direction is executed (S38), the image processing device 6 determines (S51) whether the relevant one line is a line within a predetermined range including the average height abruptly-changed coordinate xb that has been detected in step S30-2.

Herein, the predetermined range including the average height abruptly-changed coordinate xb is given, for example, as a range including the average height abruptly-changed coordinate xb and a number n of pixels on each of both the front and rear sides of the coordinate xb as a center. A value of n is, e.g., about 1 to 3.

If the relevant one line is a line within the predetermined range including the average height abruptly-changed coordinate xb that has been detected in step S30-2, the image processing device 6 sets all the height measured values of the relevant one line to the same value (S52).

In the shape defect inspection process in step S48, as described above, the calculation of the index value for the local concave/convex defect and the defect determination based on the calculated index value are performed for each set of the measured values (which may partly include the interpolated values) of one line in the Y-axis direction, which are included in the surface height distribution information. Therefore, the region made up of those lines in the Y-axis direction for which the height measured values in the surface height distribution information have been set to the same value in step S52 is actually excluded from the inspection target of the shape defect in the shape defect inspection process of step S48.

With the process illustrated in FIG. 19, for the part of the surface height distribution information corresponding to the portion where the optical cutting line having brightness equal to or greater than the preset threshold has not been detected, the height measured value is set to a value corresponding to the value interpolated based on the effective height detected values in the portion where the optical cutting line has been detected (S30-1, S31'). Hence, the problem attributable to the small recess is solved.

Further, with the process illustrated in FIG. 19, the region having the predetermined width, which contains the boundary positions of the range corresponding to the region Wxa or Wxa' where the annular mark or the quasi-annular marks are formed in the sidewall surface of the tire 1, is excluded from the target of the defect inspection through the processing of steps S30-2, S51 and S52. Hence, the problem attributable to the annular mark is also solved.

The defect-inspection exclusion region setting step (S30-2, S51 and S52) in the process illustrated in FIG. 19 is a step of setting the height measured values to the same value for the region having the predetermined width, which contains the boundary positions of the range corresponding to the region Wxa or Wxa' where the annular mark or the quasi-annular marks are formed.

However, the defect-inspection exclusion region setting step may be realized with a different process.

For example, the image processing device 6 may deliver the average height abruptly-changed coordinates xb detected in step S30-2 to the host computer 7, and the host computer 7 may execute a process of excluding the region having the predetermined width, which contains the average height abruptly-changed coordinates xb, from the target of the shape defect inspection.

In the embodiment described above, the processing in the plurality of steps is executed in a sharing manner by the image processing device 6 and the host computer 7, which are each one example of the processor.

In another embodiment, however, the processing in all of steps described above may be executed by the host computer 7, for example. In still another embodiment, the processing of the plurality of steps described above may be executed in a sharing manner by three or more processors.

INDUSTRIAL APPLICABILITY

The present invention can be applied to the tire shape inspection device.

While the present invention has been described in detail by referring to the particular embodiments, it is apparent to those skilled in the art that the present invention can be variously modified or altered without departing from the spirit and the scope of the invention. This application is on the basis of Japanese Patent Application (No. 2008-147184) filed Jun. 4, 2008, Japanese Patent Application (No. 2009-025899) filed Feb. 6, 2009, and Japanese Patent Application (No. 2009-025942) filed Feb. 6, 2009, which are hereby incorporated by reference herein in their entirety.

REFERENCE SIGNS LIST

W: tire shape inspection device
M: indication mark (embossed mark)
Wy: entire circumferential range
1: tire
2: tire rotating machine
3: sensor unit
4: unit driving device
5: encoder
6: image processing device
7: host computer
10: light emitting device
11, 12, 13: line light sources
20: camera
21: image pickup element
22: camera lens

The invention claimed is:

1. A tire shape inspection method for executing a process of inspecting a shape defect in a sidewall surface of a tire in which embossed marks are formed, the shape defect inspection process being executed based on surface height distribution information that is prepared by plotting surface height measurement values at various positions over an entire circumferential range of the sidewall surface in a two-dimensional coordinate system, which has a first coordinate axis representing a radial direction of the tire and a second coordinate axis representing a circumferential direction of the tire, the tire shape inspection method comprising:

a mask-range automatically setting step of automatically detecting a position of
the embossed mark based on sample surface shape information that is given as the surface height distribution information obtained from a sample of the tire for each type of the tire to be inspected, and automatically setting coordinate information of a mask range surrounding a range where the embossed mark exists;
an image outputting step of displaying a surface shape image, which is based on the sample surface shape information, and a mask range image, which is based on the coordinate information of the mask range, on a display unit in a superimposed relation;
a mask range changing step of changing, in parallel to the image outputting step, the coordinate information of the mask range in accordance with a predetermined operation input entered through an operating unit;
an information registration step of storing, in a storage unit, both the coordinate information of the mask range after being changed in the mask range changing step, and registered surface shape information that is part or the whole of the sample surface shape information;
a coordinate-system deviation detection step of checking inspection-use surface shape information, which is given as the surface height distribution information obtained for each tire to be inspected, with the registered surface shape information, and detecting a deviation of the coordinate system between the inspection-use surface shape information and the coordinate information of the mask range; and
a mask-range inspection exclusion step of, after correcting the deviation of the coordinate system, excluding those surface height measurement values, which are included in the inspection-use surface shape information and which correspond to the coordinate information of the mask range, from a target of the shape defect inspection process.

2. The tire shape inspection method according to claim 1, wherein the registered surface shape information is in form of the surface height measurement values, which are included in the sample surface shape information and which range entirely in a direction of the second coordinate axis at a particular coordinate on the first coordinate axis, and
the coordinate-system deviation detection step includes a step of detecting a deviation of the coordinate system in the direction of the second coordinate axis by checking the surface height measurement values, which are included in the inspection-use surface shape information and which range entirely in the direction of the second coordinate axis at the particular coordinate on the first coordinate axis, with the registered surface shape information while shifting a position in the direction of the second coordinate axis.

3. The tire shape inspection method according to claim 1, wherein the mask-range automatically setting step includes:
a two-dimensional edge detection step of detecting edges of the embossed marks with a two-dimensional edge detection process executed on the sample surface shape information, and storing detected two-dimensional edge distribution information in a storage unit;

a labeling step of executing labeling on the two-dimensional edge distribution information, and storing label distribution information obtained with the labeling in the storage unit; and a mask range setting step of setting coordinates of the mask range, which surrounds a range where the embossed mark exists, based on filet coordinates for each label value in the label distribution information, and storing the set coordinates in the storage unit.

4. The tire shape inspection method according to claim 1, wherein the image outputting step includes a step of displaying a cursor image on the display unit, and the mask range changing step includes a step of moving a displayed position of the cursor image in accordance with the operation input, and changing the coordinate information of the mask range with respect to a coordinate corresponding to the displayed position of the cursor image.

5. The tire shape inspection method according to claim 1, wherein the mask-range inspection exclusion step is a step of replacing those surface height measurement values, which are included in the inspection-use surface shape information and which fall within a range corresponding to the coordinate information of the mask range, with values interpolated based on those surface height measurement values falling outside the aforesaid range.

6. A tire shape inspection apparatus for irradiating a sidewall surface of a relatively rotating tire with line light, the sidewall surface including embossed marks formed therein, picking up an image of the line light, and deriving, based on the picked-up image, surface height distribution information that is used in shape defection inspection of the tire, the apparatus comprising:

a line light irradiation unit for emitting plural beams of line light in succession, in order to form one optical cutting line on the sidewall surface, from directions differing from a direction of detection height for the optical cutting line;

an image pickup unit for picking up images of the plural beams of line light, emitted for irradiation of the sidewall surface, in a direction in which a principal ray in each of the plural beams of line light is regularly reflected by the sidewall surface;

an optical-cutting-method shape detection unit for deriving the surface height distribution information over an entire circumferential range of the sidewall surface by detecting the optical cutting line in the image picked up by the image pickup unit;

a mask-range automatically setting unit for automatically detecting a position of the embossed mark based on sample surface shape information that is given as the surface height distribution information obtained from a sample of the tire for each type of the tire to be inspected, and automatically setting coordinate information of a mask range surrounding a range where the embossed mark exists;

an image outputting unit for displaying a surface shape image, which is based on the sample surface shape information, and a mask range image, which is based on the coordinate information of the mask range, on a display unit in a superimposed relation;

a mask range changing unit for changing, in parallel to processing executed by the image outputting unit, the coordinate information of the mask range in accordance with a predetermined operation input entered through an operating unit;

an information registration unit for storing, in a storage unit, both the coordinate information of the mask range after being changed by the mask range changing unit, and registered surface shape information that is part or the whole of the sample surface shape information;

a coordinate-system deviation detection unit for checking inspection-use surface shape information, which is given as the surface height distribution information obtained for each tire to be inspected, with the registered surface shape information, and detecting a deviation of a coordinate system between the inspection-use surface shape information and the coordinate information of the mask range; and a mask-range inspection exclusion unit for, after correcting the deviation of the coordinate system, excluding those surface height measurement values, which are included in the inspection-use surface shape information and which correspond to the coordinate information of the mask range, from a target of a shape defect inspection process.

7. A tire shape inspection method for executing a process of inspecting a shape defect in a sidewall surface of a tire in which embossed marks are formed, the shape defect inspection process being executed based on surface height distribution information that is prepared by plotting surface height measurement values at various positions over an entire circumferential range of the sidewall surface in a two-dimensional coordinate system, which has a first coordinate axis representing a radial direction of the tire and a second coordinate axis representing a circumferential direction of the tire, the tire shape inspection method comprising:

a two-dimensional edge detection step of detecting edges of the embossed marks with a two-dimensional edge detection process executed on the surface height distribution information, and storing detected two-dimensional edge distribution information in a storage unit;

a labeling step of executing labeling on the two-dimensional edge distribution information, and storing label distribution information obtained with the labeling in the storage unit;

a mask range setting step of setting coordinates of the mask range, which surrounds a range where the embossed mark exists, based on filet coordinates for each label value in the label distribution information, and storing the set coordinates in the storage unit; and a mask-range interpolation step of replacing those surface height measurement values, which are included in the surface height distribution information used in the shape defect inspection process and which fall within the mask range, with values interpolated based on those surface height measurement values falling outside the aforesaid range.

8. The tire shape inspection method according to claim 7, wherein the two-dimensional edge detection step detects the edges of the embossed marks by successively executing two-dimensional smoothing differentiation and binarization on the surface height distribution information, and detects, as the two-dimensional edge distribution information, binary distribution information that is resulted from the two-dimensional smoothing differentiation and the binarization, or corrected binary distribution information that is obtained after executing a predetermined correction process on the binary distribution information.

9. The tire shape inspection method according to claim 8, wherein the predetermined correction process executed on the binary distribution information includes dilation.

10. The tire shape inspection method according to claim 7, wherein the labeling step is a step of executing the labeling on the two-dimensional edge distribution information on an assumption that coordinates of opposite ends of the entire circumferential range are adjacent to each other, and storing the label distribution information obtained with the labeling in the storage unit; and the mask range setting step includes:
a label presence pattern determination step of determining for each label value in the label distribution information, based on the filet coordinates of the label value, that a pattern of a presence range of the label value in the direction of the second coordinate axis is which one of preset three types of presence patterns, and storing a determination result in the storage unit; and
a per-line mask range setting step of setting, per line in the direction of the second coordinate axis, the coordinates of the mask range based on the determination result of the presence pattern and a position thereof for each label value existing on the relevant one line, and storing the set coordinates in the storage unit,
the preset three types of presence patterns being a first presence pattern in which the label values continuously exist thoroughly over the entire circumferential range, a second presence pattern in which the label values separately exist in a region containing one end of the entire circumferential range and a region containing the other end thereof, and a third presence pattern in which the label values are in other states.

11. The tire shape inspection method according to claim 10, wherein in the per-line mask range setting step, per line in the direction of the second coordinate axis,
a process of, depending on the number of the label values, setting only positions where the label values exist to the mask range or setting one entire line in the direction of the second coordinate axis to the mask range is executed for the label values for which the determination result of the presence pattern is the first presence pattern,
a process of setting, to the mask range, a range from each of opposite end positions of the entire circumferential range to a position of the label value farthest away from the corresponding one of the opposite end positions of the entire circumferential range in each of two halved ranges of the entire circumferential range is executed for the label values for which the determination result of the presence pattern is the second presence pattern, and
a process of setting, to the mask range, a range covering all the positions where the label values exist is executed for the label values for which the determination result of the presence pattern is the third presence pattern.

12. The tire shape inspection method according to claim 7, wherein in the mask range interpolation step, per line in the direction of the second coordinate axis, interpolated values for those surface height measurement values falling within the mask range are calculated with straight-line interpolation based on those surface height measurement values, which are included in the surface height distribution information and which fall outside the mask range.

13. The tire shape inspection method according to claim 7, wherein the method further executes an optical-cutting-method shape detection step of detecting an optical cutting line having brightness equal to or greater than a predetermined level from a picked-up image of line light emitted for irradiation of the sidewall surface of the rotating tire, and deriving effective height detected values, which are plotted in the two-dimensional coordinate system and which correspond to positions of the optical cutting lines each having brightness equal to or greater than the predetermined level; and a measured-value normalization step of, with respect to the surface height measurement values included in the surface height distribution information per line in the direction of the second coordinate axis, setting, for a portion where the optical cutting line having brightness equal to or greater than the predetermined level has been detected, the effective height detected values in the aforesaid portion to a value normalized based on an average value of the effective height detected values of the relevant one line, and setting, for other portion in the relevant one line, the value interpolated based on the effective height detected values of the relevant one line to the value normalized based on the average value of the effective height detected values of the relevant one line, and
wherein in the two-dimensional edge detection step, the two-dimensional edge detection process is executed on the surface height distribution information including the surface height measurement values that have been normalized in the measured-value normalization step.

14. The tire shape inspection method according to claim 13, wherein the method further executes an average height abruptly-changed coordinate detection step of detecting, for a data train in a direction of the first coordinate, which includes data of an average value of the effective height detected values per line in the direction of the second coordinate axis, an average height abruptly-changed coordinate which is a coordinate on the first coordinate axis and at which an absolute value of a differential value is equal to or greater than a preset threshold; and
a defect-inspection exclusion region setting step of excluding, from the target of the shape defect inspection process, a region spanning entirely in the direction of the second coordinate axis within a coordinate range having a predetermined width and containing the average height abruptly-changed coordinates on the first coordinate axis, which are included in the surface height distribution information.

15. The tire shape inspection method according to claim 7, wherein the method further executes a measured-value normalization step of normalizing, per line in the direction of the second coordinate axis, the surface height measurement values in the surface height distribution information based on an average value of the surface height measurement values of the relevant one line, and setting, for other portion in the relevant one line, and
wherein in the two-dimensional edge detection step, the two-dimensional edge detection process is executed on the surface height distribution information including the surface height measurement values that have been normalized in the measured-value normalization step.

16. A tire shape inspection apparatus for irradiating a sidewall surface of a relatively rotating tire with line light, the sidewall surface including embossed marks formed therein, picking up an image of the line light, and deriving, based on the picked-up image, surface height distribution information that is used in shape defection inspection of the tire, the apparatus comprising:
a line light irradiation unit for emitting plural beams of line light in succession, in order to form one optical cutting line on the sidewall surface, from directions differing from a direction of detection height for the optical cutting line;

an image pickup unit for picking up images of the plural beams of line light, emitted for irradiation of the sidewall surface, in a direction in which a principal ray in each of the plural beams of line light is regularly reflected by the sidewall surface;

an optical-cutting-method shape detection unit for deriving the surface height distribution information over an entire circumferential range of the sidewall surface by detecting the optical cutting line in the image picked up by the image pickup unit; and an embossed mark exclusion unit for excluding information of a range, in which the embossed mark exists, from the surface height distribution information used in the shape defect inspection of the tire for each type of the tire based on the two-dimensional edge detection process that is executed on the surface height distribution information.

* * * * *